US012567244B2

(12) United States Patent (10) Patent No.: US 12,567,244 B2
Wang et al. (45) Date of Patent: Mar. 3, 2026

(54) METHOD AND APPARATUS FOR FUSING MULTI-SENSOR DATA

(71) Applicant: Momenta (Suzhou) Technology Co., Ltd., Suzhou City (CN)

(72) Inventors: Sida Wang, Suzhou City (CN); Di Wu, Suzhou City (CN); Zhenyan Zhu, Suzhou City (CN)

(73) Assignee: Momenta (Suzhou) Technology Co., Ltd., Suzhou City (CN)

( * ) Notice: Subject to any disclaimer, the term of this patent is extended or adjusted under 35 U.S.C. 154(b) by 275 days.

(21) Appl. No.: 18/230,266

(22) Filed: Aug. 4, 2023

(65) Prior Publication Data

US 2023/0394804 A1 Dec. 7, 2023

Related U.S. Application Data

(63) Continuation of application No. PCT/CN2022/091118, filed on May 6, 2022.

(30) Foreign Application Priority Data

May 21, 2021 (CN) .......................... 202110560098.6

(51) Int. Cl.
G06V 10/80 (2022.01)
G06V 10/75 (2022.01)

(52) U.S. Cl.
CPC .............. G06V 10/80 (2022.01); G06V 10/75 (2022.01)

(58) Field of Classification Search
CPC ...... G06V 10/80; G06V 10/75; G06V 10/806; G01S 7/4802; G01S 7/417; G01S 13/726;
(Continued)

(56) References Cited

U.S. PATENT DOCUMENTS

2019/0179006 A1 6/2019 Baba et al.
2021/0295113 A1* 9/2021 Sless ....................... G06F 18/25
(Continued)

FOREIGN PATENT DOCUMENTS

CN 109471096 A 3/2019
CN 110850403 A 2/2020
(Continued)

OTHER PUBLICATIONS

Lekic et al. "Automative radar and camera fusion using Generative Adversarial Networks", 2019, p. 1-8 (Year: 2019).*
(Continued)

*Primary Examiner* — Ming Y Hon
(74) *Attorney, Agent, or Firm* — JCIPRNET

(57) ABSTRACT

An embodiment of the present disclosure provides a method and an apparatus for fusing multi-sensor data. The method includes: obtaining a current vision perception result and a current first radar perception result; based on a current vision perception feature corresponding to each current vision perception target in each current vision perception result and a target vision feature fusion model, determining a fusion vision feature corresponding to each current vision perception target; based on the fusion vision feature corresponding to each current vision perception target, a current first radar perception feature corresponding to each current first radar perception target in the current first radar perception result and a pre-constructed radar vision feature fusion model, determining mutually-matched current vision perception targets and current first radar perception targets and corresponding current fusion perception features. In this way, accurate fusion on multi-sensor data can be achieved.

20 Claims, 4 Drawing Sheets

(58) Field of Classification Search
CPC .... G01S 13/867; G01S 13/931; G01S 13/865;
G01S 13/66
See application file for complete search history.

(56) References Cited

U.S. PATENT DOCUMENTS

| | | | | |
|---|---|---|---|---|
| 2021/0319546 | A1* | 10/2021 | Kang | G06N 20/20 |
| 2022/0043696 | A1* | 2/2022 | Kale | G06N 3/045 |
| 2022/0089179 | A1* | 3/2022 | Sakamoto | G01S 13/865 |
| 2022/0128657 | A1* | 4/2022 | Kale | G01S 13/867 |
| 2022/0176988 | A1* | 6/2022 | Wang | G06V 20/56 |
| 2022/0182784 | A1* | 6/2022 | Bhagat | G01S 17/86 |
| 2022/0188554 | A1* | 6/2022 | Huang | G01S 13/931 |
| 2022/0269900 | A1* | 8/2022 | Hölzel | G06V 10/273 |
| 2022/0327320 | A1* | 10/2022 | Perincherry | G06V 20/64 |
| 2022/0357441 | A1* | 11/2022 | Ansari | G01S 13/867 |
| 2022/0398851 | A1* | 12/2022 | Nehmadi | G01S 17/931 |
| 2025/0225779 | A1* | 7/2025 | Rambach | G06V 10/82 |

FOREIGN PATENT DOCUMENTS

| | | |
|---|---|---|
| CN | 111291714 | 6/2020 |
| CN | 111505624 | 8/2020 |
| CN | 111522026 A | 8/2020 |
| CN | 111856448 | 10/2020 |
| CN | 111862157 | 10/2020 |
| CN | 112505684 | 3/2021 |

OTHER PUBLICATIONS

China National Intellectual Property Administration, Application
No. PCT/CN2022/091118, mailed Jul. 18, 2022, 4 pages.
"Concise Explanation of Relevance for CN OA1", issued on Aug.
29, 2025, with English translation thereof, p. 1-p. 7.

* cited by examiner

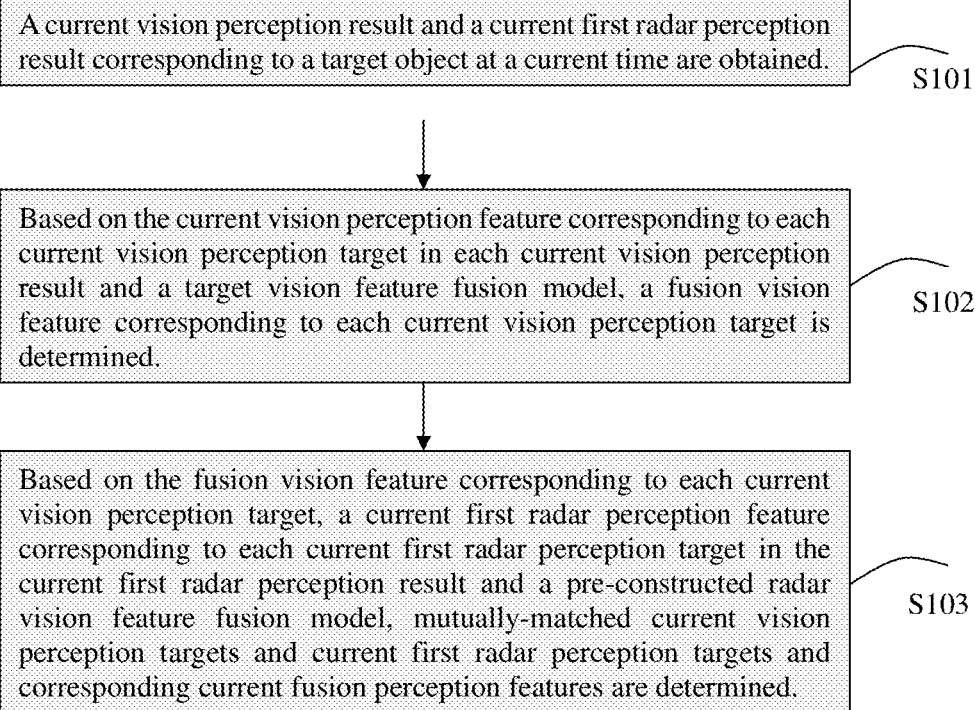

A current vision perception result and a current first radar perception result corresponding to a target object at a current time are obtained.          S101

Based on the current vision perception feature corresponding to each current vision perception target in each current vision perception result and a target vision feature fusion model, a fusion vision feature corresponding to each current vision perception target is determined.          S102

Based on the fusion vision feature corresponding to each current vision perception target, a current first radar perception feature corresponding to each current first radar perception target in the current first radar perception result and a pre-constructed radar vision feature fusion model, mutually-matched current vision perception targets and current first radar perception targets and corresponding current fusion perception features are determined.          S103

FIG.1

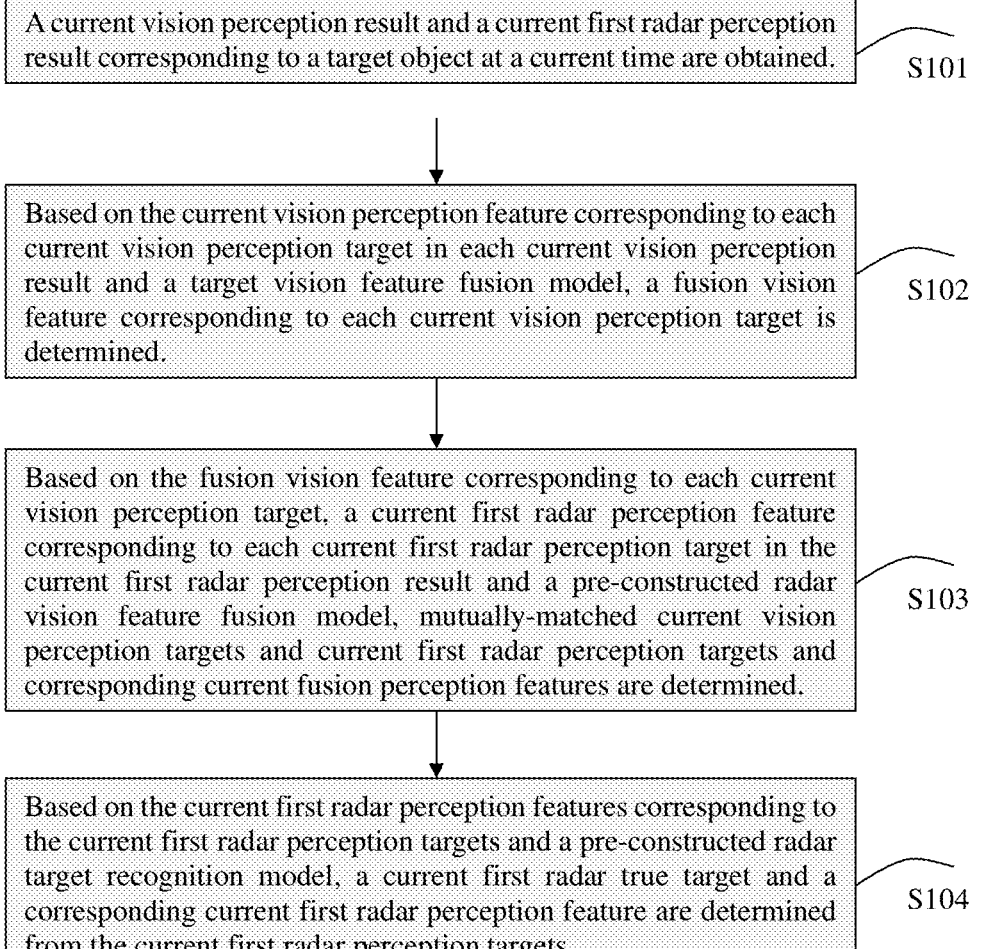

A current vision perception result and a current first radar perception result corresponding to a target object at a current time are obtained.        S101

Based on the current vision perception feature corresponding to each current vision perception target in each current vision perception result and a target vision feature fusion model, a fusion vision feature corresponding to each current vision perception target is determined.        S102

Based on the fusion vision feature corresponding to each current vision perception target, a current first radar perception feature corresponding to each current first radar perception target in the current first radar perception result and a pre-constructed radar vision feature fusion model, mutually-matched current vision perception targets and current first radar perception targets and corresponding current fusion perception features are determined.        S103

Based on the current first radar perception features corresponding to the current first radar perception targets and a pre-constructed radar target recognition model, a current first radar true target and a corresponding current first radar perception feature are determined from the current first radar perception targets.        S104

FIG.2

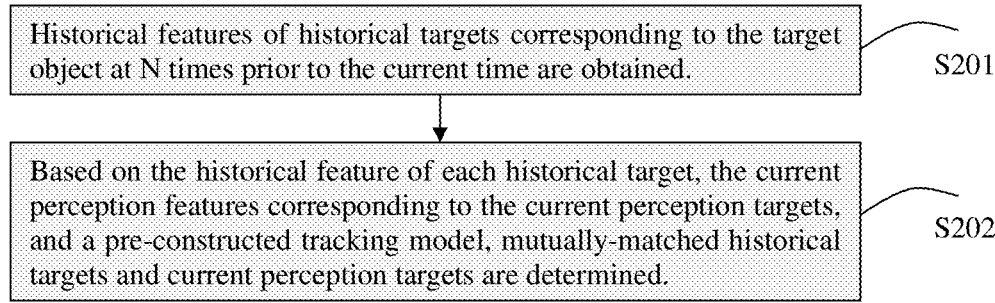

Historical features of historical targets corresponding to the target object at N times prior to the current time are obtained.

S201

Based on the historical feature of each historical target, the current perception features corresponding to the current perception targets, and a pre-constructed tracking model, mutually-matched historical targets and current perception targets are determined.

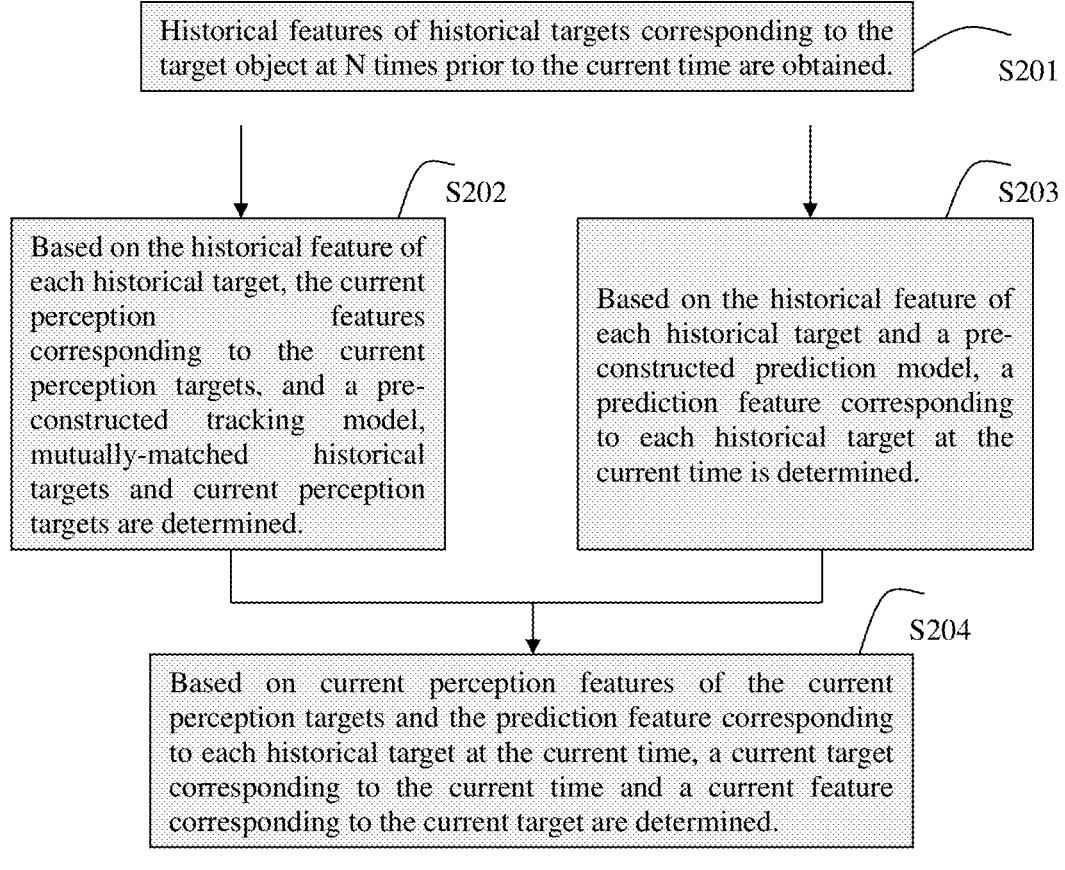

Historical features of historical targets corresponding to the target object at N times prior to the current time are obtained.

S201

Based on the historical feature of each historical target, the current perception features corresponding to the current perception targets, and a pre-constructed tracking model, mutually-matched historical targets and current perception targets are determined.

S202

Based on the historical feature of each historical target and a pre-constructed prediction model, a prediction feature corresponding to each historical target at the current time is determined.

S203

Based on current perception features of the current perception targets and the prediction feature corresponding to each historical target at the current time, a current target corresponding to the current time and a current feature corresponding to the current target are determined.

METHOD AND APPARATUS FOR FUSING MULTI-SENSOR DATA

CROSS-REFERENCE TO RELATED APPLICATIONS

This application is a continuation of International Application No. PCT/CN2022/091118, filed on May. 6, 2022, which claims priority to Chinese Patent Application No. 202110560098.6, filed on May. 21, 2021. The disclosures of the aforementioned applications are hereby incorporated by reference in their entireties.

TECHNICAL FIELD

The present disclosure relates to the field of self driving technologies, and in particular to a method and an apparatus for fusing multi-sensor data.

BACKGROUND

In a self driving solution, in order to ensure a vehicle can make correct decision in an open travel environment, the vehicle is required to be able to perceive surrounding targets as well as feature information such as target size, target position and target velocity, so as to adjust its behaviors in time. Correspondingly, for obtaining a complete and accurate perception result for the surrounding environment, different types of sensors are generally deployed for the vehicle and thus a more accurate result can be obtained by fully combining with the advantages of different sensors. Furthermore, in order to increase a perception scope of the vehicle, a plurality of sensors of same type may also be deployed, for example, image collection devices are deployed at the front, back, right and left of the vehicle. In the above deployment solution, the perception scopes of the sensors may be overlapped, that is, a same target may be perceived by different sensors, namely, a plurality of perception results are generated for the same target at the same time. Actually, it is allowed that there is only one perception result for one target at one time. Thus, it is important to find how to fuse the perception results of different sensors into one target perception result.

At present, the process of fusing the perception results of different sensors into one target perception result specifically includes: obtaining a vision perception result and a millimeter wave radar perception result; based on a velocity and a position corresponding to each vision perception target in the vision perception result, a velocity and a position corresponding to each radar perception target in the millimeter wave radar perception result, and a preset matching threshold, determining mutually-matched vision perception targets and radar perception targets; based on a preset fusion rule, and the velocities and the positions respectively corresponding to the mutually-matched vision perception targets and radar perception targets, determining fused velocity and position. In this way, the perception results of different sensors can be fused into one target perception result.

In the above process, the matching process of the vision perception targets and the radar perception targets and the fusion process of corresponding velocities and positions both are determined based on human-set threshold and rule. These processes involve many parameter designing and selection, which is not helpful to subsequent maintenance and development. Further, in a case of inappropriate parameter designing and selection, a case of no matching and inaccurate fusion result may easily occur.

SUMMARY

The present disclosure provides a method and an apparatus for fusing multi-sensor data to achieve accurate fusion on multi-sensor data. The specific solutions are described below.

According to a first aspect of embodiments of the present disclosure, there is provided a method of fusing multi-sensor data, including:

obtaining a current vision perception result and a current first radar perception result corresponding to a target object at a current time;

based on a current vision perception feature corresponding to each current vision perception target in each current vision perception result and a target vision feature fusion model, determining a fusion vision feature corresponding to each current vision perception target, where the target vision feature fusion model is a model obtained by training based on a label perception feature corresponding to each sample object at each sample time and a sample vision perception feature corresponding to each sample vision perception target;

based on the fusion vision feature corresponding to each current vision perception target, a current first radar perception feature corresponding to each current first radar perception target in the current first radar perception result and a pre-constructed radar vision feature fusion model, determining mutually-matched current vision perception targets and current first radar perception targets and corresponding current fusion perception features, where the pre-constructed radar vision feature fusion model is a model obtained by training based on the sample vision perception features, the label perception features and a sample first radar perception result corresponding to each sample first radar perception target corresponding to each sample object at each sample time.

According to a second aspect of embodiments of the present disclosure, there is provided an apparatus for fusing multi-sensor data, including:

a first obtaining module, configured to a current vision perception result and a current first radar perception result corresponding to a target object at a current time;

a first determining module, configured to, based on a current vision perception feature corresponding to each current vision perception target in each current vision perception result and a target vision feature fusion model, determining a fusion vision feature corresponding to each current vision perception target, where the target vision feature fusion model is a model obtained by training based on a label perception feature corresponding to each sample object at each sample time and a sample vision perception feature corresponding to each sample vision perception target;

a second determining module, configured to, based on the fusion vision feature corresponding to each current vision perception target, a current first radar perception feature corresponding to each current first radar perception target in the current first radar perception result and a pre-constructed radar vision feature fusion model, determining mutually-matched current vision perception targets and current first radar perception targets and corresponding current fusion perception features, wherein the pre-constructed radar vision feature fusion model is a model obtained by training based on the sample vision perception features, the label perception features and a sample first radar perception result corresponding to each sample first radar perception target corresponding to each sample object at each sample time.

It can be known from the above that, in the method and apparatus for fusing multi-sensor data according to the embodiments of the present disclosure, a current vision perception result and a current first radar perception result corresponding to a target object at a current time are obtained; based on a current vision perception feature corresponding to each current vision perception target in each current vision perception result and a target vision feature fusion model, a fusion vision feature corresponding to each current vision perception target is determined, where the target vision feature fusion model is a model obtained by training based on a label perception feature corresponding to each sample object at each sample time and a sample vision perception feature corresponding to each sample vision perception target; based on the fusion vision feature corresponding to each current vision perception target, a current first radar perception feature corresponding to each current first radar perception target in the current first radar perception result and a pre-constructed radar vision feature fusion model, mutually-matched current vision perception targets and current first radar perception targets and corresponding current fusion perception features are determined, where the pre-constructed radar vision feature fusion model is a model obtained by training based on the sample vision perception features, the label perception features and a sample first radar perception result corresponding to each sample first radar perception target corresponding to each sample object at each sample time.

In the applications of the embodiments of the present disclosure, based on the target vision feature fusion model obtained by training, fusion on the current vision perception feature corresponding to each current vision perception target in the current vision perception result is achieved to obtain the fusion vision feature corresponding to each current vision perception target, and further, by using the pre-constructed radar vision feature fusion model, fusion on the fusion vision features and the current first radar perception features respectively corresponding to the current vision perception targets and the current first radar perception targets which are mutually matched or correspond to a same physical target is achieved to obtain a relatively accurate perception feature of each physical target; by using the target vision feature fusion model and the pre-constructed radar vision feature fusion model, accurate fusion on multi-sensor data is achieved. Of course, any product or method for implementing the present disclosure does not need to have all the advantages described above at the same time.

The embodiments of the present disclosure have the following creative points.

1. Based on the target vision feature fusion model obtained by pre-training, fusion on the vision perception feature corresponding to each current vision perception target in the current vision perception result can be achieved to obtain a fusion vision feature corresponding to each current vision perception target, and further, by using the pre-constructed radar vision feature fusion model, fusion on the fusion vision feature and the current first radar perception feature respectively corresponding to the current vision perception target and the current first radar perception target which are mutually matched or correspond to a same physical target is achieved to obtain a relatively accurate perception feature of each physical target; further, by using the target vision feature fusion model and the pre-constructed radar vision feature fusion model, accurate fusion on multi-sensor data is achieved.

2. In order to avoid omission of the vision perception targets in the current vision perception result, i.e. in a vision perception device, based on the pre-constructed radar target recognition model and the current first radar perception features corresponding to the current first radar perception targets, a current first radar true target as a true target and a corresponding current first radar perception feature are determined so as to avoid target omission to some extent.

3. In order to avoid single-frame mismatching resulting in instability of a fusion result of multi-sensor data, based on the pre-constructed tracking model obtained by training, the historical feature of each historical target and the current perception features of the current perception targets, mutually-matched historical targets and current perception targets are determined to determine a current perception target with relatively accurate feature fusion of the object at the current time.

4. In order to avoid omission of perception targets, a pre-constructed prediction model may be obtained by training and then based on the historical feature of each historical target and the pre-constructed prediction model, the prediction feature corresponding to each historical target at the current time can be predicted, and further, based on the prediction feature of each historical target at the current time, supplementation of the omitted perception targets can be performed.

5. By using the training processes of the models, each model with accurate result is obtained to provide basis for subsequent fusion of multi-sensor data.

6. When the pre-constructed tracking model is constructed, after the intermediate tracking model reaching the fourth convergence condition is obtained by training, a preset smooth loss function is added to prevent the target vision feature fusion model and the pre-constructed radar vision feature fusion model from causing mismatching of the current vision perception targets and the current first radar perception targets and an error of the first radar perception features, so as to avoid jump of the velocity and/or position of the current perception targets relative to the corresponding historical targets.

BRIEF DESCRIPTION OF THE DRAWINGS

In order to more clearly describe the technical solutions of the embodiments of the present disclosure or in the prior art, drawings required for description of the embodiments or the prior arts will be briefly introduced below. Apparently, the drawings described hereunder are only some embodiments of the present disclosure. Those skilled in the art may obtain other drawings based on these drawings without making creative work.

FIG. 1 is a flowchart illustrating a method of fusing multi-sensor data according to an embodiment of the present disclosure.

FIG. 2 is another flowchart illustrating a method of fusing multi-sensor data according to an embodiment of the present disclosure.

FIG. 3 is another flowchart illustrating a method of fusing multi-sensor data according to an embodiment of the present disclosure.

FIG. 4 is another flowchart illustrating a method of fusing multi-sensor data according to an embodiment of the present disclosure.

DETAILED DESCRIPTION OF THE EMBODIMENTS

Figure 5A:
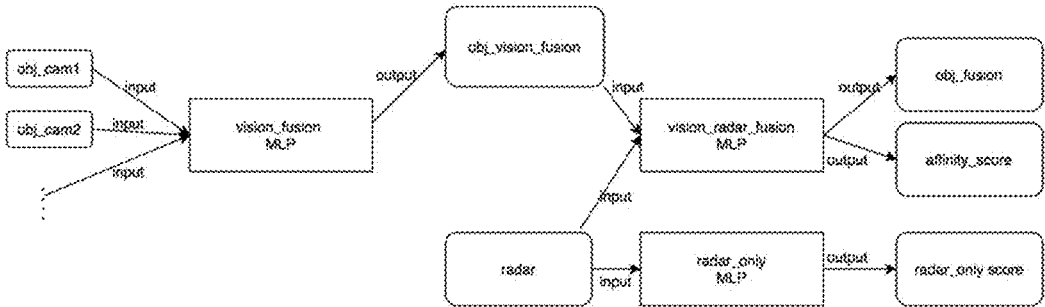
FIG. 5A is a schematic diagram illustrating structure and data flow of a single-frame fusion model according to an embodiment of the present disclosure.

The technical solutions of the embodiments of the present disclosure will be fully and clearly described below in combination with the accompanying drawings in the embodiments of the present disclosure. Apparently, the embodiments described herein are merely some embodiments of the present disclosure rather than all embodiments. Other embodiments obtained by those skilled in the art based on these embodiments without making creative work shall all fall within the scope of protection of the present disclosure.

It should be noted that the terms "including", "having" and any variation thereof in the embodiments and drawings of the present disclosure are intended to cover non-exclusive inclusion. For example, processes, methods, systems, products or devices including a series of steps or units are not limited to these listed steps or units but may optionally further include steps or units unlisted herein or optionally further include other steps or units inherent to these processes, methods, systems, products or devices.

The present disclosure provides a method and an apparatus for fusing multi-sensor data so as to achieve accurate fusion on multi-sensor data. The embodiments of the present disclosure will be detailed below.

FIG. 1 is a flowchart illustrating a method of fusing multi-sensor data according to an embodiment of the present disclosure. The method may include the following steps S101 to S103.

At step S101, a current vision perception result and a current first radar perception result corresponding to a target object at a current time are obtained.

The method of fusing multi-sensor data according to the embodiments of the present disclosure may be applied to any electronic device having computing power, which may be a terminal or a server. In an implementation, a functional software for implementing the method may exist in the form of separate client software, or in the form of a plug-in of the current relevant client software, for example, in the form of a functional module of a self driving system or the like.

The target object may be a self driving vehicle or a robot. The target object may be provided with several types of sensors which may include but not limited to: sensors for perceiving an environment and positioning. The sensors for perceiving an environment may include but not limited to: an image collection device and a radar and the like. In a case, the sensors for perceiving an environment may also be used for assistance in positioning of the target object, and the sensors for positioning may include but not limited to a wheel speed sensor, an Inertial measurement unit (IMU), a Global Positioning System (GPS), and a Global Navigation Satellite System (GNSS) and the like.

In order to obtain more complete images of the surrounding environment, the target object may be provided with a plurality of image collection devices for performing image collection for the surrounding environment of the target object respectively. The surrounding environment of the target object can be perceived by using the collected images and a vision perception result corresponding to each image collection device is obtained.

In a case, the radar may include a first radar and a sample label radar mentioned subsequently. The first radar may be a radar having a low cost and capable of obtaining information such as a position and a velocity of a target in the surrounding environment, for example a millimeter wave radar. The sample label radar may be a radar capable of obtaining information of more dimensions of a target in the surrounding environment, for example, a lidar. The sample label radar can obtain information of several dimensions, such as shape, size, velocity, type and position of a target.

In an implementation, when the target object is a self driving vehicle, a perception target in the embodiments of the present disclosure may include a vehicle or include but not limited to a pedestrian and the like. When the target object is a robot, a perception target in the embodiments of the present disclosure may include a vehicle and pedestrian and the like.

During a travel process of the target object, the image collection devices disposed thereon may periodically collect images for an environment where the target object is located and the collected images are perceived and identified through the image collection devices or other vision perception devices to obtain a vision perception result corresponding to each image collection device. Further, the first radar disposed thereon may periodically collect first radar data for the environment where the target object is located and obtain a first radar perception result based on the first radar data. In this way, the vision perception result and the first radar perception result corresponding to the target object at each time are obtained. Correspondingly, the electronic device may obtain the vision perception result and the first radar perception result corresponding to the target object at each collection time, and take the obtained vision perception result and first radar perception result corresponding to the target object at a current time as a current vision perception result and a current first radar perception result respectively. The current time refers to a collection time corresponding to the perception results requiring multi-sensor data fusion currently.

The current vision perception result may include: a current vision perception feature of each current vision perception target which is located in the environment of the target object and perceived by each image collection device of the target object at the current time. The image collection regions of different image collection devices may be overlapped, and correspondingly, a same physical target may be perceived by different image collection devices. The current vision perception feature may include but not limited to: velocity, type, shape and spatial positional information and the like of the current vision perception target. The current first radar perception result may include: a current first radar perception feature of each current first radar perception target which is located in the environment of the target object and perceived by the first radar of the target object at the current time, and the current first radar perception feature may include but not limited to: velocity and spatial positional information and the like of the current first radar perception target.

In a case, the first radar perception target perceived by the first radar is usually a spatial point, and the first radar perception feature of the corresponding first radar perception target is velocity, and spatial positional information and the like corresponding to the point.

At step S102, based on the current vision perception feature corresponding to each current vision perception target in each current vision perception result and a target vision feature fusion model, a fusion vision feature corresponding to each current vision perception target is determined.

The target vision feature fusion model vison_fusion MLP is a model obtained by training based on a label perception feature corresponding to each sample object at each sample time and a sample vision perception feature corresponding to each sample vision perception target.

A pre-trained target vision feature fusion model is stored locally in the electronic device or in a storage device connected to the electronic device to fuse the current vision perception feature corresponding to each current vision perception target corresponding to a same physical target so as to obtain a fusion vision feature corresponding to each current vision perception target. The pre-trained target vision feature fusion model is a model obtained by training based on a label perception feature corresponding to each sample object at each sample time and a sample vision perception feature corresponding to each sample vision perception target.

The number of the sample vision perception results corresponding to each sample vision perception target may be at least one and at most a number of the image collection devices of the corresponding sample object. For example, when the number of the image collection devices of a sample object is 4, the number of the sample vision perception results corresponding to each sample vision perception target is at most 4. For clarity of descriptions, the image collection device of the sample object can be referred to as sample image collection device.

During a training process, if the number of the sample vision perception results corresponding to the sample vision perception target is less than a preset perception number, that is, if some image collection devices do not perceive a physical target and some image collection devices perceive a physical target, for the image collection devices unable to perceive the physical target, in the sample vision perception results corresponding to the image collection devices, the sample vision perception feature corresponding to the sample vision perception target corresponding to the physical target may be replaced with a preset characteristic value. The preset perception number may be the number of the image collection devices of the sample object. The preset characteristic value may be 0.

The label perception feature is a perception feature perceived for the surrounding environment of the target object by a label radar of the target object at the current time. The label radar may be a radar capable of obtaining information of more dimensions of a target in the surrounding environment, for example, a lidar. The label perception feature may include information of several dimensions, such as shape, size, velocity, type and position of a perceived target. For clarity of descriptions, the target perceived by the label radar can be referred to as label radar perception target.

Fusion may refer to, for each current vision perception target, fusing the features of a same dimension in the current vision perception features corresponding to the current vision perception target into one feature. For example, if the current vision perception target 1 corresponds to three current vision perception features, there are three image collection devices perceiving the current vision perception target 1, and each image collection device corresponds to one current vision perception feature corresponding to the current vision perception target 1. The current vision perception feature includes a velocity and spatial positional information of the current vision perception target 1. Fusing the current vision perception features corresponding to the current vision perception target 1 may refer to: fusing the velocities of the current vision perception target 1 in three current vision perception features into one velocity and taking the one velocity as a fusion velocity in the fusion vision feature corresponding to the current vision perception target 1; fusing the spatial positional information of the current vision perception target 1 in three current vision perception features into one piece of spatial positional information and taking the one piece of spatial positional information as fusion spatial positional information in the fusion vision feature corresponding to the current vision perception target 1.

When the target object is a self driving vehicle, the sample object is a self driving vehicle. When the target object is a robot, the sample object is a robot.

In a case, the electronic device may determine whether there is any overlap among the spatial positional information of the current vision perception features corresponding to the current vision perception targets, so as to determine whether the current vision perception targets corresponds to one physical target. Hence, the electronic device determines the current vision perception targets having overlapping spatial positional information correspond to one physical target, and otherwise, determine the current vision perception targets not having overlapping spatial positional information correspond to different physical targets. The above case in which the spatial positional information is overlapped may refer to that a distance between different spatial positional information is not greater than a preset spatial distance threshold.

At step S103, based on the fusion vision feature corresponding to each current vision perception target, a current first radar perception feature corresponding to each current first radar perception target in the current first radar perception result and a pre-constructed radar vision feature fusion model, mutually-matched current vision perception targets and current first radar perception targets and corresponding current fusion perception features are determined.

The pre-constructed radar vision feature fusion model, i.e. vision_radar_MLP (Multilayer Perceptron) is a model obtained by training based on the sample vision perception features, the label perception features and a sample first radar perception result corresponding to each sample first radar perception target corresponding to each sample object at each sample time.

In this step, a pre-constructed radar vision feature fusion model is stored locally in the electronic device or in a storage device connected to the electronic device. The pre-constructed radar vision feature fusion model is a model pre-obtained by training based on the sample vision perception feature corresponding to each sample vision perception target corresponding to each sample object at each sample time, the label perception feature corresponding to each sample object at each sample time and the sample first radar perception result corresponding to each sample first radar perception target corresponding to each sample object at each sample time.

The pre-constructed radar vision feature fusion model is used to: determine mutually-matched current vision perception targets and current first radar perception targets corresponding to a same physical target from each current vision perception target and each current first radar perception target, and fuse the fusion vision features and the current first radar perception features respectively corresponding to the mutually-matched current vision perception targets and current first radar perception targets to obtain current fusion perception features corresponding to the mutually-matched current vision perception targets and current first radar perception targets.

Correspondingly, the electronic device performs pairing for each current vision perception target and each current first radar perception target in the current first radar perception result and inputs the fusion vision features and the current first radar perception features respectively corresponding to the paired current vision perception targets and current first radar perception targets into the pre-constructed radar vision feature fusion model. Based on the pre-constructed radar vision feature fusion model, and the fusion vision features and the current first radar perception features respectively corresponding to the paired current vision perception targets and current first radar perception targets, an affinity score affinity_score between each pair of the paired current vision perception targets and current first radar perception targets and the fusion perception feature corresponding to each pair of the paired current vision perception targets and current first radar perception targets are determined. For clarity of descriptions, the affinity score between each pair of the paired current vision perception targets and current first radar perception targets is subsequently referred to as a first affinity score.

The electronic device may, based on the first affinity score between each pair of the paired current vision perception targets and current first radar perception targets, determine the mutually-matched current vision perception targets and current first radar perception targets and corresponding current fusion perception features, i.e. determine the mutually-matched perception targets and output obj_fusion results.

In a case, the above process of determining the mutually-matched current vision perception target and current first radar perception target may include: determining a current vision perception target and a current first radar perception target both having a highest affinity score greater than a preset score threshold as mutually-matched current vision perception target and current first radar perception target.

In another case, because of the property of the first radar, a perception target corresponding to a corresponding physical target may be present in the current first radar perception targets. For one physical target, the first radar may perceive a plurality of current first radar perception targets and corresponding current first radar perception features. In order to determine well matched current vision perception targets and current first radar perception targets, based on Hungarian matching algorithm and the first affinity score between each pair of the paired current vision perception targets and current first radar perception targets, mutually-matched current vision perception targets and current first radar perception targets are determined so as to determine optimal matching relationships of the current vision perception targets and the current first radar perception targets.

After the optimal matching relationships of the current vision perception targets and the current first radar perception targets are determined, if an affinity score between a current vision perception target and a current first radar perception target having the optimal matching relationship is greater than the preset affinity threshold, it is determined that the current vision perception target and the current first radar perception target correspond to a same physical target and are mutually-matched current vision perception target and current first radar perception target. On the contrary, if an affinity score between a current vision perception target and a current first radar perception target having the optimal matching relationship is not greater than the preset affinity threshold, it is determined that the current vision perception target and the current first radar perception target correspond to different physical targets and are not mutually-matched current vision perception target and current first radar perception target. In another implementation, for a current vision perception target not matching a current first radar perception target, information for indicating the current vision perception target is not matched with the current first radar perception target is directly output and a fusion vision feature corresponding to the current vision perception target is also output, that is, obj_vision_fusion result is output for the unmatched current vision perception target.

Correspondingly, for a current first radar perception target not matching a current vision perception target, information for indicating the current first radar perception target is not matched with the current vision perception target is directly output and a current first radar perception feature corresponding to the current first radar perception target is also output.

In the application of the embodiments of the present disclosure, based on the pre-trained target vision feature fusion model, fusion on the vision perception feature corresponding to each current vision perception target in the current vision perception result can be achieved to obtain a fusion vision feature corresponding to each current vision perception target, and then based on the pre-constructed radar vision feature fusion model, fusion on the fusion vision features and the current first radar perception features respectively corresponding to the current vision perception targets and the current first radar perception targets which are mutually matched, namely correspond to a same physical target, can be achieved to obtain a relatively accurate perception feature of each physical target. Based on the target vision feature fusion model and the pre-constructed radar vision feature fusion model, accurate fusion of multi-sensor data can be achieved.

Furthermore, in the embodiments of the present disclosure, each model is pre-trained and the parameters of each model are automatically adjusted and generated based on training data. Thus, it is not required to manually adjust parameter thresholds frequently, saving human labor and facilitating subsequent maintenance and expansion.

In another embodiment of the present disclosure, as shown in FIG. 2, based on the flow of FIG. 1, the method further includes the following step S104.

At step S104, based on the current first radar perception features corresponding to the current first radar perception targets and a pre-constructed radar target recognition model, a current first radar true target and a corresponding current first radar perception feature are determined from the current first radar perception targets.

The pre-constructed radar target recognition model is a model obtained by training based on the sample first radar perception feature corresponding to each sample first radar perception target and the label perception feature.

Considering a case that a false target may be present in the first radar perception targets perceived by the first radar as well as the factors such as blocking and harsh environmental conditions and the like, blocked or unclearly identified targets may be present in the images collected by the image collection devices, and hence, there may be a case that corresponding vision perception targets are undetected. In order to solve the above problems, in the present implementation, a pre-constructed radar target recognition model is pre-stored locally in the electronic device or in a storage device connected to the electronic device. The pre-constructed radar target recognition model is a model obtained by training based on the sample first radar perception feature corresponding to each sample first radar perception target and the label perception feature. The model can determine a first radar true target as a true physical target from the first radar perception targets. The true physical target refers to a target of a type to be perceived by the target object. For example, when the target object is a self driving vehicle, a vehicle is a target of a type to be perceived by the target object.

Correspondingly, the electronic device inputs the current first radar perception features corresponding to the current first radar perception targets into the pre-constructed radar target recognition model to obtain a score that each current first radar perception target is a true physical target, where the score is used to represent a possibility that the corresponding first radar perception target is a true physical target. For example, a higher score indicates a higher possibility that the corresponding current first radar perception target is a true physical target. Furthermore, based on the score that each current first radar perception target is a true physical target, a current first radar true target and a corresponding current first radar perception feature are determined from the current first radar perception targets. If the score that the current first radar perception target is a true physical target exceeds a preset true physical target score threshold, it is determined that the current first radar perception target is a true physical target; conversely, if the score that the current first radar perception target is a true physical target does not exceed the preset true physical target score threshold, it is determined that the current first radar perception target is not a true physical target.

Subsequently, in an implementation, a current first radar true target without matching current vision perception target is determined as a supplementary first radar true target from the determined current first radar true targets; based on the current first radar perception feature corresponding to the supplementary first radar true target, and the current fusion perception feature corresponding to the mutually-matched current vision perception target and current first radar perception target, a perception feature corresponding to a target perceived by the target object at the current time, i.e. a current perception feature corresponding to a current perception target corresponding to the target object at the current time, is determined. Correspondingly, for the supplementary first radar true target, i.e. unmatched current first radar true target, a corresponding current first radar perception feature is output, namely, radar_only target is output.

In a case, the current first radar perception feature corresponding to the supplementary first radar true target, and the current fusion perception feature corresponding to the mutually-matched current vision perception target and current first radar perception target are directly determined as the current perception feature corresponding to the current perception target corresponding to the target object at the current time.

In another embodiment of the present disclosure, as shown in FIG. 3, based on the flow of FIG. 1, the method further includes the following step S201.

At step S201, historical features of historical targets corresponding to the target object at N times prior to the current time are obtained.

where N is a positive integer and the historical features include: a feature obtained after a fusion vision feature corresponding to a matching historical vision perception target corresponding to each historical time and a feature corresponding to a historical first radar perception target are fused and optimized, an optimized feature corresponding to the first radar perception target without matching vision perception target corresponding to each historical time, and/or, a prediction feature corresponding to an unperceived target of each historical time obtained by prediction based on a perception feature corresponding to a perceived target of a time prior to the historical time.

At step S202, based on the historical feature of each historical target, the current perception features corresponding to the current perception targets, and a pre-constructed tracking model, mutually-matched historical targets and current perception targets, and optimized current perception features corresponding to the current perception targets matching the historical targets are determined.

The current perception feature corresponding to the current perception target includes: the current fusion perception features corresponding to the mutually-matched current vision perception targets and current first radar perception targets, and/or, a radar perception feature corresponding to the current first radar true target without matching current vision perception target.

In an implementation, if a current perception target has no matching historical target, the current perception feature corresponding to the current perception target without matching historical target is an optimized current perception feature corresponding to the current perception target.

The pre-constructed tracking model is a model obtained by training based on a sample perception feature corresponding to a sample perception target corresponding to each sample object at each sample time, sample historical features corresponding to sample historical targets corresponding to each sample object at N times prior to each sample time and label matching information corresponding to each sample perception target corresponding to each sample object at each sample time.

Considering mismatching may occur to the target vision feature fusion model and the pre-constructed radar vision feature fusion model, that is, the current vision perception target and the current first radar perception target corresponding to different physical targets are mistaken as corresponding to a same physical target, the current vision perception feature corresponding to the current vision perception target and the current first radar perception feature corresponding to the current first radar perception target are fused together, resulting in an error of a current fusion perception feature obtained by fusion.

In the embodiments of the present disclosure, due to the mismatching of the current vision perception target and the current first radar perception target and the error of the first radar perception feature caused by the target vision feature fusion model and the pre-constructed radar vision feature fusion model, there may be a case of jump of the position and/or velocity of the current perception target relative to the corresponding historical target. In order to ensure smoothness of change of the target position, a continuous frame tracking model, i.e. the pre-constructed tracking model TrackingNetMLP is disposed. Based on the historical features of historical targets corresponding to historical times, the current perception features corresponding to the matching current perception targets are optimized to obtain relatively smoother optimized current perception features corresponding to the current perception targets.

Correspondingly, a pre-constructed tracking model is pre-stored locally in the electronic device or in a storage device connected to the electronic device. The pre-constructed tracking model can achieve tracking on a target, that is, can determine whether a current perception target and a historical target correspond to a same physical target and use the historical features of the historical targets corresponding to the historical times to perform smoothing optimization on the current perception features corresponding to their matching current perception targets. In a case, the pre-constructed tracking model is a model based on convolutional network where a convolutional kernel is a convolutional kernel of 1*N. The current perception targets corresponding to the historical targets are current perception targets with which the historical targets correspond to a same physical target.

Correspondingly, the electronic device obtains the historical features of the historical targets perceived by the target object at N historical times prior to the current time, where N is a positive integer and each historical time of the N historical times may correspond to at least one historical target and a corresponding historical feature.

The historical feature of the historical target corresponding to each historical time may have three sources. A first source: for each historical time, based on the historical vision perception feature corresponding to each historical vision perception target corresponding to the historical time and the target vision feature fusion model, obtaining a vision fusion feature corresponding to each historical vision perception target corresponding to the historical time; based on the vision fusion feature corresponding to each historical vision perception target corresponding to the historical time, the first radar perception feature corresponding to the historical first radar perception target corresponding to the historical time and the pre-constructed radar vision feature fusion model, determining a fusion perception feature corresponding to mutually-matched historical vision perception target and first radar perception target corresponding to the historical time; based on the features corresponding to the targets corresponding to N times prior to the historical time, the fusion perception feature corresponding to mutually-matched historical vision perception target and first radar perception target corresponding to the historical time and the pre-constructed tracking model, determining an optimized fusion perception feature corresponding to the mutually-matched historical vision perception target and first radar perception target corresponding to the historical time, that is, a feature obtained after the fusion vision feature corresponding to the matching historical vision perception target corresponding to the historical time and the feature corresponding to the historical first radar perception target are fused and optimized;

a second source: for each historical time, based on the pre-constructed radar target recognition model and the first radar perception feature corresponding to each first radar perception target corresponding to the historical time, determining the first radar perception feature corresponding to the first radar true target not matching the historical target corresponding to the historical time and corresponding to the historical time; further, based on the pre-constructed tracking model, the first radar perception feature corresponding to the first radar true target of the historical target corresponding to the historical time and features corresponding to targets corresponding to N times prior to the historical time, determining an optimized feature corresponding to the first radar perception target without matching vision perception target corresponding to the historical time;
a third source: based on a perception feature corresponding to a perceived target of a time prior to each historical time, obtaining, by prediction, a prediction feature corresponding to an unperceived target of the historical time.

Correspondingly, the electronic device performs pairing for the historical targets and the current perception targets, inputs the historical feature and the current perception feature respectively corresponding to each pair of paired historical targets and current perception targets into the pre-constructed tracking model, and based on the pre-constructed tracking model and the historical feature and the current perception feature respectively corresponding to each pair of paired historical targets and current perception targets, determines an affinity score between each pair of paired historical targets and current perception targets and an optimized current perception feature corresponding to each pair of paired historical targets and current perception targets. For clarity of descriptions, the affinity score between each pair of paired historical targets and current perception targets is subsequently referred to as a second affinity score.

The optimized current perception features corresponding to paired historical targets and current perception targets include optimized current perception features corresponding to the current perception targets matching the historical targets and optimized current perception features corresponding to the current perception targets not matching the historical targets.

The electronic device may, based on Hungarian matching algorithm and the second affinity score between each pair of paired historical targets and current perception targets, determine optimal matching relationships between the historical targets and the current perception targets. If a second affinity score between a historical target and a current perception target having the optimal matching relationship is greater than the preset affinity threshold, it is determined that the historical target and the current perception target correspond to a same physical target and are mutually-matched historical target and current perception target. On the contrary, if a second affinity score between a historical target and a current perception target having the optimal matching relationship is not greater than the preset affinity threshold, it is determined that the historical target and the current perception target correspond to different physical targets for target tracking.

It should be understood that each historical target corresponds to N historical features, where, if a perception feature of a historical target is not truly perceived at a historical time, a preset characteristic value is used to replace the perception feature corresponding to the historical target at the historical time.

The label pairing information corresponding to each sample perception target corresponding to each sample object at each sample time includes: information for indicating whether each sample perception target corresponding to the sample object at each sample time and each sample historical target perceived by the sample object at N times prior to the sample time correspond to a same physical target. For example, a sample perception target i corresponding to a sample object i at the sample time corresponds to the same physical target as a sample historical target j perceived by the sample object i at N times prior to the sample time and corresponds to a physical target different from that to which another sample historical target c perceived by the sample object i at N times prior to the sample time corresponds. Correspondingly, label pairing information corresponding to the sample perception target i includes: information for representing it corresponds to the same physical target as the sample historical target j and information for representing it corresponds to a physical target different from that to which another sample historical target c corresponds.

In a case, the information for representing the sample perception target i and the sample historical target j correspond to a same physical target can be expressed by an affinity score true value between the sample perception target i and the sample historical target j. For example, the affinity score true value is a first value, for example, 1. Correspondingly, the information for representing the sample perception target i and another sample historical target c correspond to different physical targets may be expressed by an affinity score true value between the sample perception target i and the another sample historical target c, for example, the affinity score true value is a second value, for example, 0.

The sample perception feature corresponding to the sample perception target corresponding to each sample object at each time can be obtained in two manners.

In a first manner, for each sample object, a sample vision perception result and a sample first radar perception result corresponding to the sample object at each sample time are obtained. For the sample vision perception result and the sample first radar perception result corresponding to each sample object at each historical time, based on the sample vision perception feature corresponding to each sample vision perception target in the sample vision perception result and the target vision feature fusion model, a fusion vision feature corresponding to each sample vision perception target is determined; each sample vision perception target and each sample first radar perception target in the sample first radar perception result are paired to obtain paired sample vision perception targets and sample first radar perception targets; the fusion vision features and the sample first radar perception features respectively corresponding to paired sample vision perception targets and sample first radar perception targets are input into the pre-constructed radar vision feature vision model to determine an affinity score between each pair of paired sample vision perception targets and sample first radar perception targets as a third affinity score and a fusion perception feature corresponding to each pair of paired sample vision perception targets and sample first radar perception targets. Based on the third affinity score between each pair of paired sample vision perception targets and sample first radar perception targets and Hungarian matching algorithm, optimal matching relationships between the sample vision perception targets and the sample first radar perception radars are determined. Based on the third affinity score between the sample vision perception targets and the sample first radar perception targets having the optimal matching relationship and a preset affinity threshold, whether each pair of paired sample vision perception targets and sample first radar perception targets corresponds to a same physical target is determined.

The sample vision perception target and the sample first radar perception target which have a third affinity score greater than the preset affinity threshold and an optimal matching relationship are determined as a sample vision perception target and a sample first radar perception target corresponding to a same physical target, that is, as mutually-matched sample vision perception target and sample first radar perception target; and the fusion perception feature corresponding to the sample vision perception target and the sample first radar perception target having an optimal matching relationship is determined as a sample perception feature corresponding to the sample perception target.

In a second manner, for a sample first radar perception result corresponding to each sample object at each historical time, based on historical first radar perception features corresponding to historical first radar perception targets in the sample first radar perception result and the pre-constructed radar target recognition model, a historical first radar true target and a corresponding historical first radar perception feature are determined from the historical first radar perception targets, and then, a historical first radar true target without matching sample vision perception target is determined as a sample perception target from the determined historical first radar true targets. The historical first radar perception feature corresponding to the historical first radar true target without matching sample vision perception target is taken as a sample perception feature corresponding to the sample perception target.

In another embodiment of the present disclosure, as shown in FIG. 2, based on the flow of FIG. 1, the method further includes the following steps S203 to S204.

At step S203, based on the historical feature of each historical target and a pre-constructed prediction model, a prediction feature corresponding to each historical target at the current time is determined.

The pre-constructed prediction model is a model obtained by training based on sample historical perception results corresponding to sample historical targets corresponding to each sample object at N times prior to each sample time, and label matching information corresponding to each sample perception target corresponding to each sample object at each sample time.

At step S204, based on current perception features of the current perception targets and the prediction feature corresponding to each historical target at the current time, a current target corresponding to the current time and a current feature corresponding to the current target are determined.

It is considered that the target object may omit a perception target at a time. In order to ensure the travel safety of the target object, a pre-constructed prediction model PredictNet may be pre-stored locally in the electronic device or in a storage device connected to the electronic device. The pre-constructed prediction model is used to, based on the historical features of the historical targets corresponding to the historical times prior to the current time, predict a prediction feature corresponding to each historical target at the current time.

The electronic device obtains the historical feature of each historical target and inputs it into the pre-constructed prediction model and thus the prediction feature corresponding to the current time can be determined based on the pre-constructed prediction model.

In a case, the pre-constructed prediction model is a model based on convolutional network, where a convolutional kernel is a convolutional kernel of 1*N. The model is used to extract sequence data features, namely, the features of the historical features of the historical targets.

Furthermore, based on the current perception features of the current perception targets and the prediction feature corresponding to each historical target at the current time, a current target corresponding to the current time and a corresponding current feature are determined, namely, a current perception target with corresponding current perception feature is directly determined as the current target. Based on the prediction feature corresponding to each historical target at the current time, a current unperceived target is determined and a prediction feature corresponding at the current time to the historical target corresponding to the current unperceived target is determined as the current target and the current feature corresponding to the current target.

In another implementation, if a target is not perceived for several continuous times, that is, the target does not successfully match a historical target, this target may be destroyed, that is, the prediction feature corresponding to the target is rejected.

By using the pre-constructed prediction model and the pre-constructed tracking model, the destruction of the target may be delayed. Further, the case that a truly existing target is not perceived occasionally at several times, which affects a travel decision of the target object is avoided, and the continuity of the target tracking can be improved.

In another embodiment of the present disclosure, before the step S102, the method further includes the following step 01.

At step 01, a target vision feature fusion model is constructed, which includes the following steps.

At step 011, an initial vision feature fusion model is obtained.

At step 012, a label perception feature corresponding to each sample object at each sample time and a sample vision perception feature corresponding to each sample vision perception target are obtained.

Each label perception feature is a label perception feature perceived by a sample label radar of the corresponding sample object at the corresponding sample time, and the sample vision perception feature corresponding to each sample vision perception target is a vision perception feature perceived by a sample image collection device group of the corresponding sample object at the corresponding sample time.

At step 013, based on the sample vision perception feature corresponding to each sample vision perception target and the label perception feature, the initial vision feature fusion model is trained until the initial vision feature fusion model reaches a first convergence condition, so as to obtain a target vision feature fusion model.

In this implementation, a process of constructing the target vision feature fusion model is provided. The electronic device may firstly obtain an initial vision feature fusion model which may be a model based on deep learning algorithm.

The electronic device may obtain the label perception feature corresponding to each sample object at each sample time and the sample vision perception feature corresponding to each sample vision perception target. The sample vision perception feature corresponding to the sample vision perception target is a vision perception feature corresponding to a vision perception target perceived by the sample image collection device of each sample object at each sample time. The label perception feature is a perception feature corresponding to each sample label radar perception target perceived by the sample label radar of each sample object at each sample time.

The sample vision perception feature corresponding to each sample vision perception target includes: a vision perception feature perceived by each sample image collection device of the corresponding sample object at the sample time. If a sample image collection device does not perceive a sample vision perception target at the sample time, the vision perception feature corresponding to the sample vision perception target corresponding to the sample image collection device at the sample time is replaced with a preset characteristic value.

A correspondence is present between a label perception feature corresponding to a sample object at a sample time and a sample vision perception feature corresponding to each sample vision perception target.

The electronic device randomly inputs the label perception feature corresponding to the sample label radar perception target corresponding to each sample object at each sample time and the sample vision perception feature corresponding to each sample vision perception target and being in correspondence with the label perception feature into a current vision feature fusion model; based on the current vision feature fusion model, the sample vision perception feature corresponding to each sample vision perception target corresponding to each sample object at each sample time is fused to obtain a fusion vision feature of each sample vision perception target corresponding to each sample object at each sample time; based on the fusion vision feature of each sample vision perception target corresponding to each sample object at each sample time and the label perception feature corresponding to each sample label radar perception target corresponding to each sample object at each sample time and being in correspondence with the fusion vision feature, and a first preset loss function, a corresponding loss value is calculated as a first loss value.

The current vision feature fusion model is an initial vision feature fusion model or an initial vision feature fusion model with adjusted model parameters.

The sample label radar perception target and the sample vision perception target in mutual correspondence are: a sample label radar perception target and a sample vision perception target perceived by a sample object for a same physical target at a sample time.

Whether the first loss value is less than a first loss threshold is determined. If the first loss value is less than the first loss threshold, it is determined that the current vision feature fusion model reaches the first convergence condition, so as to obtain the target vision feature fusion model. If the first loss value is not less than the first loss threshold, the values of the model parameters of the current vision feature fusion model are adjusted and the step of randomly inputting the label perception feature corresponding to the sample label radar perception target corresponding to each sample object at each sample time and the sample vision perception feature corresponding to each sample vision perception target and being in correspondence with the label perception feature into the current vision feature fusion model is repeated until the calculated first loss value is less than the first loss threshold. In this case, it is determined that the current vision feature fusion model reaches the first convergence condition, so as to obtain the target vision feature fusion model.

The first preset loss function may be Smooth L1 loss function.

In another embodiment of the present disclosure, before the step S103, the method further includes the following step 02.

At step 02, a pre-constructed radar vision feature fusion model is constructed, which includes the following steps.

At step 021, an initial radar vision feature fusion model is obtained.

At step 022, a sample first radar perception feature corresponding to each sample first radar perception target corresponding to each sample object at each sample time is obtained.

The sample first radar perception feature corresponding to each sample first radar perception target is a first radar perception feature perceived by the sample first radar of the corresponding sample object at the corresponding sample time.

At step 023, based on the sample vision fusion feature corresponding to each sample vision perception target corresponding to each sample object at each sample time, the sample first radar perception feature corresponding to each sample first radar perception target corresponding to each sample object at each sample time, the label matching information between each sample vision perception target and each sample first radar perception target, and the label perception feature corresponding to each sample object at each sample time, the initial radar vision feature fusion model is trained until the initial radar vision feature fusion model reaches a second convergence condition, so as to determine a pre-constructed radar vision feature fusion model.

The sample vision fusion feature corresponding to the sample vision perception target is a fusion feature obtained through fusion based on the sample vision perception feature corresponding to the sample vision perception target and the target vision feature fusion model.

The label matching information between each sample vision perception target and each sample first radar perception target includes: information for representing whether the sample vision perception target and the sample first radar perception target correspond to a same physical target, for example, the sample vision perception target a and the sample first radar perception target b correspond to a same physical target, and the sample vision perception target a and the sample first radar perception target c correspond to different physical targets. In a case, the label matching information may be expressed by an affinity score true value. When the sample vision perception target a and the sample first radar perception target b correspond to a same physical target, their corresponding affinity score true value may be set to a first value, for example, 1. On the contrary, when the sample vision perception target a and the sample first radar perception target c correspond to different physical targets, their corresponding affinity score true value may be set to a second value, for example, 0.

In this implementation, a process of constructing and training a pre-constructed radar vision feature fusion model is provided. The electronic device obtains an initial radar vision feature fusion model. In a case, the initial radar vision feature fusion model is a model based on deep learning algorithm.

The electronic device obtains the sample first radar perception feature corresponding to each sample first radar perception target corresponding to each sample object at each sample time. For a perception target corresponding to each sample object at each sample time, the sample vision perception target corresponding to the sample object at the sample time and the sample first radar perception target corresponding to the sample object at the sample time are paired to obtain paired sample vision perception targets and sample first radar perception targets. The sample vision fusion features and the sample first radar perception features respectively corresponding to paired sample vision perception targets and sample first radar perception targets, the label matching information between each pair of paired sample vision perception targets and sample first radar perception targets, and the label perception feature of the sample vision perception target corresponding to the sample object at the sample time are randomly input into the current radar vision feature fusion model.

Based on the current radar vision feature fusion model and the sample vision fusion features and the sample first radar perception features respectively corresponding to paired sample vision perception targets and sample first radar perception targets, an affinity score between each pair of paired sample vision perception targets and sample first radar perception targets is determined as a fourth affinity score; a fusion perception feature corresponding to each pair of paired sample vision perception targets and sample first radar perception targets is determined as a training fusion perception feature.

By using the label matching information between each pair of paired sample vision perception targets and sample first radar perception targets, a sample vision perception target and a sample first radar perception target which truly correspond to a same physical target are determined as truly-matched sample vision perception target and sample first radar perception target from each pair of paired sample vision perception targets and sample first radar perception targets. Paired sample vision perception targets and sample first radar perception targets which do not correspond to a same physical target are determined as unmatched sample vision perception targets and sample first radar perception targets.

By using a first regression loss function, a first classification loss function, the fourth affinity score and the training fusion perception feature corresponding to truly-matched sample vision perception targets and sample first radar perception targets, and the fourth affinity score corresponding to mismatched sample vision perception target and sample first radar perception target, a corresponding loss value is calculated as a second loss value.

In an implementation, the first regression loss function may be Smooth L1 loss function. The first classification loss function may be Binary Cross Entropy (BEC) loss function.

For the truly-matched sample vision perception targets and sample first radar perception targets, the corresponding loss value includes a classification loss value calculated based on the corresponding fourth affinity score, label matching information and the first classification loss function, and a loss value calculated based on the corresponding training fusion perception feature and label perception feature and the first regression loss function.

For the mismatched sample vision perception targets and sample first radar perception targets, the corresponding loss value includes a loss value calculated based on the corresponding fourth affinity score and the first classification loss function.

Further, based on the loss value corresponding to the truly-matched sample vision perception targets and sample first radar perception targets and the loss value corresponding to the mismatched sample vision perception targets and sample first radar perception targets, a second loss value is determined, that is, a sum of the loss value corresponding to the truly-matched sample vision perception targets and sample first radar perception targets and the loss value corresponding to the mismatched sample vision perception targets and sample first radar perception targets is determined as the second loss value.

Whether the second loss value is less than a second loss threshold is determined. If the second loss value is less than the second loss threshold, it is determined that the current radar vision feature fusion model reaches a second convergence condition and the current radar vision feature fusion model is determined as the pre-constructed radar vision feature fusion model.

If the second loss value is not less than the second loss threshold, the values of the model parameters of the current radar vision feature fusion model are adjusted and the step of randomly inputting the sample vision fusion features and the sample first radar perception features respectively corresponding to paired sample vision perception targets and sample first radar perception targets, the label matching information between each pair of paired sample vision perception targets and sample first radar perception targets, and the label perception feature of the sample vision perception target corresponding to the sample object at the sample time into the current radar vision feature fusion model is repeated.

The current radar vision feature fusion model is an initial radar vision feature fusion model or a radar vision feature fusion model with adjusted model parameters.

In another embodiment of the present disclosure, before the step S104, the method further includes the following step 03.

At step 03, a pre-constructed radar target recognition model is constructed, which includes the following steps.

At step 031, an initial radar target recognition model is obtained.

At step 032, label truth information corresponding to each sample first radar perception target corresponding to each sample object at each sample time is obtained.

The label truth information is information for indicating whether the corresponding sample first radar perception target is a true first radar perception target. In a case, the label truth information can be expressed by a truth label true value. When the sample first radar perception target is a true first radar perception target, the truth label true value of the corresponding target is a third value, for example, 1. When the sample first radar perception target is not a true first radar perception target, the truth label true value of the corresponding target is a fourth value, for example, 0.

At step 033, based on the sample first radar perception feature corresponding to each sample first radar perception target corresponding to each sample object at each sample time and the corresponding label truth information, the initial radar target recognition model is trained until the initial radar target recognition model reaches a third convergence condition, so as to obtain a pre-constructed radar target recognition model.

In this implementation, a process of constructing a pre-constructed radar target recognition model is provided. The electronic device may firstly obtain the initial radar target recognition model, and obtain the label truth information corresponding to each sample first radar perception target corresponding to each sample object at each sample time. In a case, the initial radar target recognition model may be a model based on deep learning algorithm.

For each sample first radar perception target corresponding to each sample object at each sample time, the electronic device randomly inputs the sample first radar perception feature corresponding to the sample first radar perception target corresponding to the sample object at the sample time and the corresponding label truth information into a current radar target recognition model to obtain prediction truth information corresponding to the sample first radar perception feature. If the label truth information is valued 1 or 0, the prediction truth information is valued between 0 and 1 accordingly.

Based on the second classification loss function, the prediction truth information corresponding to the sample first radar perception feature and the label truth information, a current loss value is calculated as a third loss value.

Whether the third loss value is less than a third loss threshold is determined. If the third loss value is less than the third loss threshold, it is determined that the current radar target recognition model reaches the third convergence condition and thus the current radar target recognition model is determined as a pre-constructed radar target recognition model. If the third loss value is not less than the third loss threshold, the values of the model parameters of the current radar target recognition model are adjusted and the step of, for each sample first radar perception target corresponding to each sample object at each sample time, randomly inputting the sample first radar perception feature corresponding to the sample first radar perception target corresponding to the sample object at the sample time and the corresponding label truth information into the current radar target recognition model to obtain the prediction truth information corresponding to the sample first radar perception feature is repeated until the calculated third loss value is less than the third loss threshold. In this case, it is determined that the current radar target recognition model reaches the third convergence condition and the current radar target recognition model is determined as a pre-constructed radar target recognition model.

The second classification loss function may be BCELoss loss function.

In another embodiment of the present disclosure, before the step S202, the method further includes the following step 04:

At step 04, a process of constructing a pre-constructed tracking model is provided, which includes the following steps.

At 041, an initial tracking model is obtained.

At 042, for each sample object, the sample historical features corresponding to the sample historical targets corresponding to the sample object at N times prior to each sample time are obtained.

The sample historical features includes: features obtained after vision fusion features corresponding to matching sample vision perception targets corresponding to the sample object at N times prior to each sample time and features corresponding to the sample first radar perception targets are fused and optimized, optimized features corresponding to the sample first radar perception targets without matching sample vision perception targets corresponding to N times prior to each sample time, and/or, a prediction feature corresponding to an unperceived target of each sample time obtained by prediction based on perception features corresponding to sample historical targets corresponding to N times prior to the sample time.

At 043, for each sample perception target corresponding to each sample object at each sample time, the label pairing information corresponding to the sample perception target corresponding to the sample target at the sample time is obtained.

The label pairing information corresponding to the sample perception target includes: information for indicating whether the sample perception target corresponds to the same physical target as the sample historical targets perceived by the sample object at N times prior to the sample time.

At 044, based on the sample perception feature corresponding to the sample perception target corresponding to each sample object at each sample time, the sample historical features corresponding to the sample historical targets corresponding to each sample object at N times prior to each sample time, the label pairing information corresponding to each sample perception target corresponding to each sample object at each sample time and the label perception feature corresponding to each sample object at each sample time, the initial tracking model is trained until the initial tracking model reaches a fourth convergence condition, so as to obtain a pre-constructed tracking model.

The sample perception feature includes: the sample fusion perception feature corresponding to the mutually-matched sample vision perception targets and sample first radar perception targets corresponding to each sample object at each sample time, and/or, the first radar perception feature corresponding to the sample first radar true target without matching sample vision perception target and determined based on the sample radar perception feature corresponding to the sample first radar perception target and the pre-constructed radar target recognition model.

In this implementation, a process of constructing a pre-constructed tracking model is provided. The electronic device obtains an initial tracking model. The initial tracking model is a model based on convolutional network where a convolutional kernel is a convolutional kernel of 1*N. By using the convolutional kernel of 1*N, N sample historical features corresponding to the sample historical targets corresponding to each sample object at each sample time are processed.

For each sample object, the sample historical features corresponding to the sample historical targets corresponding to the sample object at N times prior to each sample time are obtained, where the sample historical features corresponding to the sample historical targets corresponding to the sample object at N times prior to the sample time includes: a sample historical feature corresponding to a sample historical target corresponding to the (T−1)-th time prior to the sample time T, and a sample historical feature corresponding to a sample historical target corresponding to the (T−2)-th time and so on, and a sample historical feature corresponding to a sample historical target corresponding to the (T−N)-th time.

The sample historical features includes: features obtained after vision fusion features corresponding to matching sample vision perception targets corresponding to the sample object at N times prior to each sample time and features corresponding to the sample first radar perception targets are fused and optimized, optimized features corresponding to the sample first radar perception targets without matching sample vision perception targets corresponding to N times prior to each sample time, and/or, a prediction feature corresponding to an unperceived target of each sample time obtained by prediction based on perception features corresponding to sample historical targets corresponding to N times prior to the sample time.

Mutual matching of sample vision perception targets and sample first radar perception targets means: vision perception targets and first radar perception targets perceived by the image collection device and the first radar of a same sample object for a same physical object at a same time.

The vision fusion feature corresponding to the sample vision perception target is: a feature obtained by fusing the vision perception features perceived for the sample vision perception target by the image collection device of the sample object at a sample time.

For each sample perception target corresponding to each sample object at each sample time, the label pairing information corresponding to the sample perception target corresponding to the sample target at the sample time is obtained, where the label pairing information corresponding to the sample perception target includes: information for indicating whether the sample perception target corresponds to the same physical target as the sample historical targets corresponding to the sample object at N times prior to the sample time.

The label pairing information corresponding to the sample perception target includes: an affinity score true value between the sample perception target corresponding to the sample object at the sample time and the sample historical targets corresponding to the sample object at N times prior to the sample time. When the sample perception target and the sample historical target correspond to a same physical target, the affinity score true value between the sample perception target and the sample historical target is denoted as a first value, for example, 1. When the sample perception target and the sample historical target correspond to different physical targets, the affinity score true value between the sample perception target and the sample historical target is denoted as a second value, for example, 0.

For each sample perception object corresponding to each sample object at each sample time, the electronic device performs pairing for each sample perception target corresponding to the sample object at the sample time and the sample historical targets corresponding to the sample object at N times prior to the sample time to obtain paired sample perception targets and sample historical targets; and randomly inputs the sample perception features and the sample historical features respectively corresponding to the paired sample perception targets and sample historical targets, the label pairing information corresponding to the sample perception targets and the label perception feature corresponding to the sample perception target corresponding to the sample object at the sample time into a current tracking model, where the current tracking model is an initial tracking model or a tracking model with adjusted model parameters.

Based on the current tracking model and the sample perception features and the sample historical features respectively corresponding to paired sample perception targets and sample historical targets, an affinity score between each pair of paired sample perception targets and sample historical targets is obtained as a fifth affinity score, which is a matching affinity mentioned subsequently. Then, optimized sample perception features corresponding to the sample perception targets and optimized based on the sample historical features corresponding to the matching sample historical targets are determined as optimized sample perception features corresponding to the sample perception targets in paired sample perception targets and sample historical targets.

When a number of the obtained fifth affinity scores reaches a preset batch size, based on a third regression loss function, a third classification loss function and the preset batch size number of fifth affinity scores between the paired sample perception targets and sample historical targets, the affinity score true value between each pair of paired sample perception targets and sample historical targets in the label pairing information, the optimized sample perception features corresponding to the sample perception targets in the paired sample perception targets and sample historical targets and the label perception features corresponding to the sample perception targets in the paired sample perception targets and sample historical targets, a current loss value is calculated as a fourth loss value. The label perception features corresponding to the sample perception targets in the paired sample perception targets and sample historical targets include the label perception feature corresponding to each sample object at each sample time.

It can be understood that it is possible that the sample perception targets and the sample historical targets corresponding to a same sample object at a same sample time are paired. The sample perception targets and the sample historical targets corresponding to a same sample object at a same sample time are: sample perception targets corresponding to a sample object at a sample time and sample historical targets corresponding to the sample object at N times prior to the sample time.

Firstly, if the affinity score true value between the sample perception target and the sample historical target in the label pairing information is the first value, based on the third regression loss function, the optimized perception feature corresponding to the sample perception target in the paired sample perception target and sample historical target, and the label perception feature, a regression loss value corresponding to the paired sample perception target and sample historical target is calculated.

Based on the third classification loss function, the fifth affinity score between the paired sample perception target and sample historical target, and the affinity score true value between the paired sample perception target and sample historical target in the label pairing information, a classification loss value corresponding to the paired sample perception target and sample historical target is calculated.

Based on the regression loss value corresponding to the paired sample perception target and sample historical target and the classification loss value corresponding to the paired sample perception target and sample historical target, a loss value corresponding to the paired sample perception target and sample historical target is determined as a part of the fourth loss value.

Secondly, if the affinity score true value between the sample perception target and the sample historical target in the label pairing information is the second value, based on the third classification loss function, the fifth affinity score between the paired sample perception target and sample historical target, and the affinity score true value between the sample perception target and the sample historical target in the label pairing information, a classification loss value corresponding to the paired sample perception target and sample historical target is calculated as a loss value corresponding to the paired sample perception target and sample historical target which serves as a part of the fourth loss value.

In a case, an accumulated sum of the loss value corresponding to the paired sample perception target and sample historical target with the affinity score true value in the label pairing information being the first value and the loss value corresponding to the paired sample perception target and sample historical target with the affinity score true value in the label pairing information being the second value is determined as the fourth loss value.

Whether the fourth loss value is less than a fourth loss threshold is determined. If the fourth loss value is less than the fourth loss threshold, it is determined that the current tracking model reaches the fourth convergence condition and the current tracking model is determined as the pre-constructed tracking model. On the contrary, if the fourth loss value is not less than the fourth loss threshold, the values of the model parameters of the current tracking model are adjusted and the step of, for the sample perception target corresponding to each sample object at each sample time, randomly inputting the sample perception feature corresponding to each sample perception target corresponding to the sample object at the sample time, the sample historical features corresponding to the sample historical targets corresponding to the sample object at N times prior to the sample time, the label pairing information corresponding to each sample perception target corresponding to the sample object at the sample time, and the label perception feature corresponding to the sample object at the sample time into the current tracking model is repeated until the fourth loss value is less than the fourth loss threshold. In this case, it is determined that the current tracking model reaches the fourth convergence condition, and the current tracking model is determined as the pre-constructed tracking model.

The third regression loss value is also a preset regression loss function mentioned below, which may be Smooth L1 loss function. The third classification loss value is also a preset classification loss function mentioned below, which may be a BCE Loss function.

In order to avoid the mismatching of the above target vision feature fusion model and pre-constructed radar vision feature fusion model and the error of the first radar perception feature, which result in jump of position or velocity in the perception feature corresponding to each perception target, after the tracking model reaching the fourth convergence condition is obtained by normal training, a preset smooth loss function is added to fine-tune the model parameters of the tracking model reaching the fourth convergence condition, such that the perception feature corresponding to the perception target change more smoothly than the historical feature of the corresponding historical target. In another embodiment of the present disclosure, the step 045 may include the following steps 0451 to 0455.

At step 0451, for each sample perception target corresponding to each sample object at each sample time, pairing is performed on each sample perception target corresponding to the sample object at the sample time and the sample historical targets corresponding to the sample object at N times prior to the sample time to obtain paired sample perception targets and sample historical targets corresponding to the sample object at the sample time.

At step 0452, the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception features are randomly input into the current tracking model to obtain a matching affinity between each pair of the paired sample perception targets and sample historical targets and the optimized sample perception features corresponding to the sample perception targets.

The optimized sample perception features corresponding to the sample perception targets: are features by optimizing the sample perception features corresponding to the sample perception targets based on the sample historical features corresponding to the sample historical targets matching the sample perception targets.

The matching affinity between the paired sample perception target and sample historical target represent a probability value that the paired sample perception target and sample historical target are a same physical target, and the current tracking model is an initial tracking model or a tracking model with adjusted model parameters. In a case, the higher the matching affinity between the paired sample perception target and sample historical target is, the probability value that the paired sample perception target and sample historical target are a same physical target is larger. Correspondingly, the possibility that the paired sample perception target and sample historical target are a same physical target is larger.

At step 0453, when a number of the obtained matching affinities corresponding to the sample perception targets reaches a preset batch size, based on the preset batch size number of matching affinities between the paired sample perception targets and sample historical targets, the label pairing information corresponding to the sample perception targets in the paired sample perception targets and sample historical targets, the optimized sample perception features corresponding to the sample perception targets, the label perception features, a preset regression loss function, and a preset classification loss function, a current loss value corresponding to the current tracking model is determined.

At step 0454, when the current loss value is less than a preset loss threshold, it is determined that the current tracking model reaches the fourth convergence condition and an intermediate tracking model is obtained.

At step 0455, by using a preset smooth loss function, the preset regression loss function, the preset classification loss function, the sample perception features and the sample historical features respectively corresponding to the paired sample perception targets and sample historical targets corresponding to each sample object at each sample time, the label pairing information corresponding to the sample perception targets in the paired sample perception targets and sample historical targets, the label perception features, and specified sample historical features corresponding to the sample historical targets in the paired sample perception targets and sample historical targets, model parameters of an intermediate tracking model are adjusted until the intermediate tracking model reaches a fifth convergence condition so as to obtain a pre-constructed tracking model.

The specified sample historical features corresponding to the sample historical targets in the paired sample perception targets and sample historical targets are sample historical features of the sample historical targets in the paired sample perception targets and sample historical targets at a previous time of the sample time corresponding to the sample perception targets.

At step 0456, if the current loss value is not less than the preset threshold, the values of the model parameters of the current tracking model are adjusted and the step 0451 is repeated until the current tracking model reaches the fourth convergence condition, so as to obtain an intermediate tracking model.

The preset smooth loss function may be expressed by the following formula:

$$S1 = \sum_m (|\text{obj\_tracking} - \text{obj\_fusion}[j]_{t1}|)/m * \lambda$$

where m refers to a preset batch size, $\lambda$ is a hyperparameter used to adjust a loss size, obj_tracking represents a preset batch size number of optimized sample perception features corresponding to the sample perception targets in the paired sample perception targets and sample historical targets in the output of the current intermediate tracking model; obj_fusion[j]$_{t1}$ refers to the specified sample historical features corresponding to the sample historical targets in the paired sample perception targets and sample historical targets, where the specified sample historical features corresponding to the sample historical targets in the paired sample perception targets and sample historical targets are sample historical features of the sample historical targets in the paired sample perception targets and sample historical targets at a previous time of the sample time corresponding to the sample perception targets. For example, when a sample time corresponding to a sample perception target in paired sample perception target and sample historical target is a sample time E, and correspondingly, the specified sample historical feature corresponding to the sample historical target in the paired sample perception target and sample historical target is the sample historical feature of the sample historical target at a previous time of the sample time E.

In an embodiment of the present disclosure, the electronic device, after obtaining the intermediate tracking model, obtains paired sample perception targets and sample historical targets corresponding to each sample object at each sample time; randomly inputs the sample perception features and the sample historical features respectively corresponding to the paired sample perception targets and sample historical targets, the label pairing information corresponding to the sample perception targets in the paired sample perception targets and sample historical targets, the label perception feature, and the specified sample historical features corresponding to the sample historical targets in the paired sample perception targets and sample historical targets into the current intermediate tracking model, where the current intermediate tracking model is an initial intermediate tracking model or an intermediate tracking model with adjusted model parameters.

Based on the current intermediate tracking model and the sample perception features and the sample historical features respectively corresponding to the paired sample perception targets and sample historical targets, an affinity score between each pair of paired sample perception targets and sample historical targets is obtained as a sixth affinity score; and, optimized sample perception features corresponding to the sample perception targets in paired sample perception targets and sample historical targets are obtained.

When a number of the obtained sixth affinity scores reaches a preset batch size, based on the third regression loss function, the third classification loss function, the preset batch size number of sixth affinity scores between the paired sample perception targets and sample historical targets corresponding to each sample object at the sample time, affinity score true values between the paired sample perception targets and sample historical targets in the label pairing information, the optimized sample perception features corresponding to the sample perception targets in paired sample perception targets and sample historical targets, and the label perception features, a current first partial loss value is calculated.

The process of calculating the first partial loss value can be referred to the above process of calculating the fourth loss value and will not be repeated herein.

Furthermore, when the number of the obtained sixth affinity scores reaches the preset batch size, based on a preset smooth loss function, a preset batch size number of optimized sample perception features corresponding to the sample perception targets in the paired sample perception targets and sample historical targets, and the specified sample historical features corresponding to the sample historical targets in the paired sample perception targets and sample historical targets, a current second partial loss value is calculated.

By using the first partial loss value and the second partial loss value, a current loss value corresponding to the current intermediate tracking model is determined as a fifth loss value.

Whether the fifth loss value is less than a fifth loss threshold is determined. If the fifth loss value is less than the fifth loss threshold, it is determined that the current intermediate tracking model reaches a fifth convergence condition and the current intermediate tracking model is determined as a pre-constructed tracking model. On the contrary, if the fifth loss value is not less than the fifth loss threshold, the values of the model parameters of the current intermediate tracking model are adjusted and the step of randomly inputting the sample perception features and the sample historical features respectively corresponding to the paired sample perception targets and sample historical targets, the label pairing information corresponding to the sample perception targets in the paired sample perception targets and sample historical targets, the label perception feature and the specified sample historical features corresponding to the sample historical targets in the paired sample perception targets and sample historical targets into the current intermediate tracking model is repeated until the fifth loss value is less than the fifth loss threshold. In this case, it is determined that the current intermediate tracking model reaches the fifth convergence condition, and the current intermediate tracking model is determined as a pre-constructed tracking model.

In another embodiment of the present disclosure, before the step S203, the method further includes the following step 05.

At step 05, a process of constructing a pre-constructed prediction model is provided, which includes the following steps.

At step 051, an initial prediction model is obtained.

At step 052, based on the sample historical features corresponding to the sample historical targets corresponding to each sample object at N times prior to each sample time and the label perception features, the initial prediction model is trained until the initial prediction model reaches a sixth convergence condition so as to obtain a pre-constructed prediction model.

In this implementation, a process of constructing a pre-constructed prediction model is provided. The electronic device obtains an initial prediction model, where the initial prediction model is a model based on convolutional network, where a convolutional kernel is a convolutional kernel of 1*N. The model is used to process the sample historical features corresponding to the sample historical targets corresponding to each sample object at N times prior to each sample time.

For each sample historical target perceived by each sample object at N times prior to each sample time, the electronic device randomly inputs the sample historical feature corresponding to the sample historical target perceived by the sample object at N times prior to the sample time and the label perception feature corresponding to the sample historical target in the label perception features into the current prediction model to obtain a prediction feature corresponding to the sample historical target. The current prediction model is an initial prediction model or a prediction model with adjusted model parameters.

The label perception feature corresponding to the sample historical target is a label perception feature corresponding to a matching sample label radar perception target corresponding to the sample object corresponding to the sample historical target at the corresponding sample time. The matching sample label radar perception target is a perception target with which the sample historical target corresponds to a same physical target.

After the number of the obtained prediction features reaches a second batch size, the electronic device calculates a current loss value as a fourth loss value based on the fourth regression loss function and the second batch size number of prediction features corresponding to the sample historical targets and the label perception features. Whether the fourth loss value is less than a fourth loss threshold is determined. If the fourth loss value is less than the fourth loss threshold, it is determined the current prediction model reaches a sixth convergence condition and the current prediction model is determined a pre-constructed prediction model. If the fourth loss value is not less than the fourth loss threshold, the values of the model parameters of the current prediction model are adjusted and the step of randomly inputting the sample historical feature corresponding to the sample historical target perceived by the sample object at N times prior to the sample time and the label perception feature corresponding to the sample historical target in the label perception features into the current prediction model to obtain the prediction feature corresponding to the sample historical target is repeated until the fourth loss value is less than the fourth loss threshold. In this case, it is determined that the current prediction model reaches the sixth convergence condition and the current prediction model is determined as a pre-constructed prediction model.

In an implementation, compared with the pre-constructed tracking model and the pre-constructed prediction model, the above target vision feature fusion model, the pre-constructed vision radar feature fusion model and the pre-constructed radar target recognition model can be collectively referred to as single-frame fusion model and correspondingly, the pre-constructed tracking model and the pre-constructed prediction model can be referred to as continuous-frame Tracking model.

As shown in FIG. 5A, it is schematic diagram illustrating structure and data flow of a single-frame fusion model. As shown in FIG. 5A, the single-frame fusion model includes a target vision feature fusion model "vison_fusion MLP", a pre-constructed vision radar feature fusion model "vision_radar_MLP", and a pre-constructed radar target recognition model "radar_only_MLP". The input of the target vision feature fusion model is a vision perception feature corresponding to each vision perception target corresponding to the time t0, for example, "obj_cam1", "obj_cam2" and the like shown in FIG. 5A, and the output of the target vision feature fusion model is a fusion vision perception feature corresponding to each vision perception target, i.e., "obj_vision_fusion" as shown in FIG. 5A.

The inputs of the pre-constructed vision radar feature fusion model "vision_radar_MLP" are: the fusion vision perception feature "obj_vision_fusion" corresponding to each vision perception target and output by the target vision feature fusion model and a first radar perception feature corresponding to each first radar perception target corresponding to the corresponding time t0, for example, "radar" shown in FIG. 5A. The fusion vision perception feature corresponding to each vision perception target and the first radar perception feature corresponding to each first radar perception target are input in the corresponding form of paired vision perception target and first radar perception target.

The outputs of the pre-constructed vision radar feature fusion model are fusion perception features "obj_fusion" corresponding to the paired vision perception targets and first radar perception targets and the affinity scores "affinity_score". Furthermore, the electronic device, based on the affinity scores corresponding to the paired vision perception targets and first radar perception targets "affinity_score", Hungarian matching algorithm and a preset affinity threshold, determine fully-matched vision perception targets and first radar perception targets and corresponding fusion perception features.

The input of the pre-constructed radar target recognition model "radar_only_MLP" is the first radar perception feature corresponding to each first radar perception target corresponding to the time to; and the output is a score that the each first radar perception target is a true physical target, i.e. "radar_only_score" shown in FIG. 5A. Subsequently, based on the score that the each first radar perception target is a true physical target and a preset true physical target score threshold, a first radar true target and a corresponding first radar perception feature are determined.

Figure 5B:
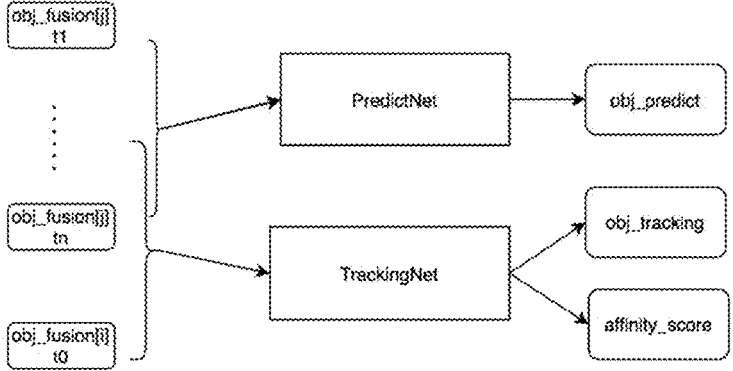
FIG. 5B is a schematic diagram illustrating structure and data flow of a continuous-frame Tracking model according to an embodiment of the present disclosure.

As shown in FIG. 5B, it is a schematic diagram illustrating structure and data flow of a continuous-frame Tracking model. As shown in FIG. 5B, the continuous-frame Tracking model includes a pre-constructed tracking model "Tracking Net", and a pre-constructed prediction model "Predict Net". The inputs of the pre-constructed tracking model "Tracking Net" are the perception features corresponding to the current perception targets corresponding to the time t0, including the fusion perception feature corresponding to the mutually-matched vision perception target and first radar perception target corresponding to the time t0, for example, obj_fusion [j] t0 shown in FIG. 5, the first radar perception feature corresponding to the first radar true target corresponding to the time t0, and the historical features corresponding to the historical targets corresponding to N historical times t0−1, t0−2, . . . and t0−N prior to the time t0, for example, obj_fusion[j] t1–obj_fusion[j] tn shown in FIG. 5. The historical feature corresponding to each historical target includes: a feature obtained after the fusion vision feature corresponding to the matching vision perception target corresponding to each historical time and the feature corresponding to the matching radar perception target are fused, and a feature corresponding to the first radar perception target without matching vision perception target in the historical radar perception result corresponding to each historical time, and/or, a prediction feature corresponding to an unperceived target of each historical time obtained by prediction based on a perception feature corresponding to a perceived target of a time prior to the historical time.

The outputs of the pre-constructed tracking model "Tracking Net" are a tracking result corresponding to the time t0, for example, obj_tracking shown in FIG. 5, and an affinity score "affinity_score" between paired current perception target and historical target. The tracking result corresponding to the time t0 includes an optimized perception feature corresponding to the successfully-matched current perception target.

The inputs of the pre-constructed prediction model "Predict Net" are the historical features corresponding to the historical targets corresponding to N historical times t0−1, t0−2, and t0−N prior to the time t0, for example, obj_fusion [j] t1-obj_fusion[j] tn shown in FIG. 5; and the output is the prediction feature corresponding to each historical target at the time t0. Subsequently, a prediction feature corresponding to the current perception target without matching historical target, i.e. "obj_predict" shown in FIG. 5, is determined from the prediction feature corresponding to each historical target at the time t0. In combination with the optimized perception feature corresponding to the successfully-matched current perception target, the current feature corresponding to the current target is determined.

Figure 6:
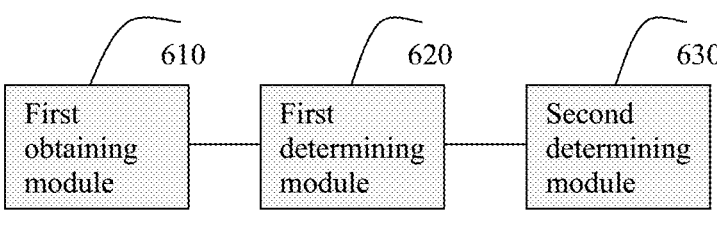
FIG. 6 is a structural schematic diagram illustrating an apparatus for fusing multi-sensor data according to an embodiment of the present disclosure.

Corresponding to the above method embodiments, an embodiment of the present disclosure provides an apparatus. As shown in FIG. 6, the apparatus includes:

a first obtaining module 610, configured to obtain a current vision perception result and a current first radar perception result corresponding to a target object at a current time;

a first determining module 620, configured to, based on a current vision perception feature corresponding to each current vision perception target in each current vision perception result and a target vision feature fusion model, determine a fusion vision feature corresponding to each current vision perception target, where the target vision feature fusion model is a model obtained by training based on a label perception feature corresponding to each sample object at each sample time and a sample vision perception feature corresponding to each sample vision perception target;

a second determining module 630, configured to, based on the fusion vision feature corresponding to each current vision perception target, a current first radar perception feature corresponding to each current first radar perception target in the current first radar perception result and a pre-constructed radar vision feature fusion model, determine mutually-matched current vision perception targets and current first radar perception targets and corresponding current fusion perception features, where the pre-constructed radar vision feature fusion model is a model obtained by training based on the sample vision perception features, the label perception features and a sample first radar perception result corresponding to each sample first radar perception target corresponding to each sample object at each sample time.

In the applications of the embodiments of the present disclosure, based on the pre-trained target vision feature fusion model, fusion on the vision perception feature corresponding to each current vision perception target in the current vision perception result is achieved to obtain the fusion vision feature corresponding to each current vision perception target, and further, by using the pre-constructed radar vision feature fusion model, fusion on the fusion vision features and the current first radar perception features respectively corresponding to the current vision perception targets and the current first radar perception targets which are mutually matched or correspond to a same physical target is achieved to obtain a relatively accurate perception feature of each physical target; by using the target vision feature fusion model and the pre-constructed radar vision feature fusion model, accurate fusion on multi-sensor data is achieved.

In another embodiment of the present disclosure, the apparatus further includes:

a third determining module (not shown), configured to, based on the current first radar perception features corresponding to the current first radar perception targets and a pre-constructed radar target recognition model, determine a current first radar true target and a corresponding current first radar perception feature from the current first radar perception targets, where the pre-constructed radar target recognition model is a model obtained by training based on the sample first radar perception feature corresponding to each sample first radar perception target and the label perception features.

In another embodiment of the present disclosure, the apparatus further includes:

a second obtaining module (not shown), configured to obtain historical features of historical targets corresponding to the target object at N historical times prior to the current time, where N is a positive integer and the historical features include: a feature obtained after a fusion vision feature corresponding to a matching historical vision perception target corresponding to each historical time and a feature corresponding to a historical first radar perception target are fused and optimized, an optimized feature corresponding to the first radar perception target without matching vision perception target in the historical radar perception result corresponding to each historical time, and/or, a prediction feature corresponding to an unperceived target of each historical time obtained by prediction based on a perception feature corresponding to a perceived target of a time prior to the historical time;

a fourth determining module (not shown), configured to, based on the historical feature of each historical target, the current perception features corresponding to the current perception targets, and a pre-constructed tracking model, determine mutually-matched historical targets and current perception targets, and optimized current perception features corresponding to the current perception targets matching the historical targets, where the current perception features corresponding to the current perception targets include: the current fusion perception features corresponding to the mutually-matched current vision perception targets and current first radar perception targets, and/or, a radar perception feature corresponding to the current first radar true target without matching current vision perception target; the pre-constructed tracking model is a model obtained by training based on a sample perception feature corresponding to a sample perception target corresponding to each sample object at each sample time, sample historical features corresponding to sample historical targets corresponding to each sample object at N times prior to each sample time and label matching information corresponding to each sample perception target corresponding to each sample object at each sample time.

In another embodiment of the present disclosure, the apparatus further includes:

a fifth determining module (not shown), configured to, based on the historical feature of each historical target and a pre-constructed prediction model, determine a prediction feature corresponding to each historical target at the current time, where the pre-constructed prediction model is a model obtained by training based on sample historical perception results corresponding to sample historical targets corresponding to each sample object at N times prior to each sample time, and label matching information corresponding to each sample perception target corresponding to each sample object at each sample time;

a sixth determining module (not shown), configured to, based on current perception features of the current perception targets and the prediction feature corresponding to each historical target at the current time, determine a current target corresponding to the current time and a current feature corresponding to the current target.

In another embodiment of the present disclosure, the apparatus further includes:

a first model constructing module (not shown), configured to, before determining the fusion vision feature corresponding to each current vision perception target based on the vision perception feature corresponding to each current vision perception target in each current vision perception result and the target vision feature fusion model, construct the target vision feature fusion model. The first model constructing module is specifically configured to:

obtain an initial vision feature fusion model;

obtain the label perception feature corresponding to each sample object at each sample time and the sample vision perception feature corresponding to each sample vision perception target, where each label perception feature is a label perception feature perceived by a sample label radar of the corresponding sample object at the corresponding sample time, and the sample vision perception feature corresponding to each sample vision perception target is a vision perception feature perceived by a sample image collection device group of the corresponding sample object at the corresponding sample time;

by using the sample vision perception feature corresponding to each sample vision perception target and the label perception features, train the initial vision feature fusion model until the initial vision feature fusion model reaches a first convergence condition, so as to obtain a target vision feature fusion model.

In another embodiment of the present disclosure, the apparatus further includes:

a second model constructing module (not shown), configured to, before, based on the fusion vision feature corresponding to each current vision perception target, the current first radar perception feature corresponding to each current first radar perception target in the current first radar perception result and the pre-constructed radar vision feature fusion model, determining the mutually-matched current vision perception targets and current first radar perception targets and the corresponding current fusion perception features, construct the pre-constructed radar vision feature fusion model. The second model constructing module is specifically configured to: obtain an initial radar vision feature fusion model;

obtain the sample first radar perception feature corresponding to each sample first radar perception target corresponding to each sample object at each sample time, where the sample first radar perception feature corresponding to each sample first radar perception target is a first radar perception feature perceived by a sample first radar of the corresponding sample object at the corresponding sample time;

based on a sample vision fusion feature corresponding to each sample vision perception target corresponding to each sample object at each sample time, the sample first radar perception feature corresponding to each sample first radar perception target corresponding to each sample object at each sample time, the label matching information between each sample vision perception target and each sample first radar perception target and the label perception feature corresponding to each sample object at each sample time, train the initial radar vision feature fusion model until the initial radar vision feature fusion model reaches a second convergence condition, so as to obtain a pre-constructed radar vision feature fusion model, where the sample vision fusion feature corresponding to the sample vision perception target is a fusion feature obtained through fusion based on the sample vision perception feature corresponding to the sample vision perception target and the target vision feature fusion model.

In another embodiment of the present disclosure, the apparatus further includes:

a third model constructing module (not shown), configured to, before, based on the current first radar perception features corresponding to the current first radar perception targets and the pre-constructed radar target recognition model, determining the current first radar true target and the corresponding current first radar perception feature from the current first radar perception targets, construct the pre-constructed radar target recognition model. The third model constructing module is specifically configured to: obtain an initial radar target recognition model;

obtain label truth information corresponding to each sample first radar perception target corresponding to each sample object at each sample time, where the label truth information is information for indicating whether the corresponding sample first radar perception target is a true first radar perception target;

based on the sample first radar perception feature corresponding to each sample first radar perception target corresponding to each sample object at each sample time and the corresponding label truth information, train the initial radar target recognition model until the initial radar target recognition model reaches a third convergence condition, so as to obtain a pre-constructed radar target recognition model.

In another embodiment of the present disclosure, the apparatus further includes:

a fourth model constructing module (not shown), configured to, before, based on the historical feature of each historical target, the current perception features corresponding to the current perception targets and the pre-constructed tracking model, determining mutually-matched historical targets and current perception targets, construct the pre-constructed tracking model. The fourth model constructing module includes:

a first obtaining unit (not shown), configured to obtain an initial tracking model;

a second obtaining unit (not shown), configured to, for each sample object, obtain the sample historical features corresponding to the sample historical targets corresponding to the sample object at N times prior to each sample time, where the sample historical features include: features obtained after vision fusion features corresponding to matching sample vision perception targets corresponding to the sample object at N times prior to each sample time and features corresponding to the sample first radar perception targets are fused and optimized, optimized features corresponding to the sample first radar perception targets without matching sample vision perception targets corresponding to N times prior to each sample time, and/or, a prediction feature corresponding to an unperceived target of each sample time obtained by prediction based on perception features corresponding to sample historical targets corresponding to N times prior to the sample time;

a third obtaining unit (not shown), configured to, for each sample perception target corresponding to each sample object at each sample time, obtain the label pairing information corresponding to the sample perception target corresponding to the sample target at the sample time, where the label pairing information corresponding to the sample perception target includes: information for indicating whether the sample perception target is the same physical target as the sample historical targets corresponding to the sample object at N times prior to the sample time; a training unit (not shown), configured to, based on the sample perception features corresponding to the sample perception targets corresponding to each sample object at each sample time, the sample historical features corresponding to the sample historical targets corresponding to each sample object at N times prior to each sample time, the label pairing information corresponding to each sample perception target corresponding to each sample object at each sample time and the label perception feature corresponding to each sample object at each sample time, train the initial tracking model until the initial tracking model reaches a fourth convergence condition, so as to obtain a pre-constructed tracking model, where the sample perception features include: the sample fusion perception features corresponding to the mutually-matched sample vision perception targets and sample first radar perception targets corresponding to each sample object at each sample time, and/or, the first radar perception feature corresponding to the sample first radar true target without matching sample vision perception target and determined based on the sample radar perception features corresponding to the sample first radar perception targets and the pre-constructed radar target recognition model.

In another embodiment of the present disclosure, the training unit is specifically configured to, for each sample perception target corresponding to each sample object at each sample time, perform pairing for each sample perception target corresponding to the sample object at the sample time and the sample historical targets corresponding to the sample object at N times prior to the sample time to obtain paired sample perception targets and sample historical targets corresponding to the sample object at the sample time;

randomly input the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception features into a current tracking model to obtain a matching affinity between the paired sample perception targets and sample historical targets and the optimized sample perception features corresponding to the sample perception targets, where the matching affinity between the paired sample perception target and sample historical target represents a probability value that the paired sample perception target and sample historical target are a same physical target, and the current tracking model is an initial tracking model or a tracking model with adjusted model parameters;

when a number of the obtained matching affinities corresponding to the sample perception targets reaches a preset batch size, based on the preset batch size number of matching affinities between the paired sample perception targets and sample historical targets, the label pairing information corresponding to the sample perception targets in the paired sample perception targets and sample historical targets, the optimized sample perception features corresponding to the sample perception targets, the label perception features, a preset regression loss function, and a preset classification loss function, determine a current loss value corresponding to the current tracking model;

when the current loss value is less than a preset loss threshold, determine the current tracking model reaches the fourth convergence condition and obtain an intermediate tracking model;

by using a preset smooth loss function, the preset regression loss function, the preset classification loss function, the sample perception features and the sample historical features respectively corresponding to the paired sample perception targets and sample historical targets corresponding to each sample object at each sample time, the label pairing information corresponding to the sample perception targets in the paired sample perception targets and sample historical targets, the label perception features, and specified sample historical features corresponding to the sample historical targets in the paired sample perception targets and sample historical targets, adjust model parameters of the intermediate tracking model until the intermediate tracking model reaches a fifth convergence condition so as to obtain a pre-constructed tracking model, where the specified sample historical features corresponding to the sample historical targets in the paired sample perception targets and sample historical targets are sample historical features of the sample historical targets in the paired sample perception targets and sample historical targets at a previous time of the sample time corresponding to the sample perception targets;

if the current loss value is not less than the preset threshold, adjust the values of the model parameters of the current tracking model and repeat the step of randomly inputting the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception feature into the current tracking model to obtain the matching affinity corresponding to the sample perception targets until the current tracking model reaches the fourth convergence condition, so as to obtain an intermediate tracking model.

In another embodiment of the present disclosure, the apparatus further includes:

a fifth model constructing module (not shown), configured to, before, based on the historical feature of each historical target and the pre-constructed prediction model, determining the prediction feature corresponding to each historical target at the current time, construct the pre-constructed prediction model. The fifth model constructing module is specifically configured to: obtain an initial prediction model;

based on the sample historical features corresponding to the sample historical targets corresponding to each sample object at N times prior to each sample time and the label perception features, train the initial prediction model until the initial prediction model reaches a sixth convergence condition so as to obtain a pre-constructed prediction model Corresponding to the method embodiments, the system and apparatus embodiments have the same technical effects with detailed descriptions referred to the method embodiments. The apparatus embodiments are obtained based on method embodiments and detailed descriptions may be referred to the corresponding part of the method embodiments and will not be repeated herein. Persons of ordinary skills in the prior art may understand that the drawings are only illustrations of the embodiments and the modules or flows in the drawings are not necessary for implementing the present disclosure.

Persons of ordinary skills in the prior art may understand that the modules in the apparatus of the embodiments may be distributed in the apparatus of the embodiments based on the descriptions of the embodiments, or changed accordingly to be located in one or more apparatuses different from the present embodiments. The modules in the above embodiments may be combined into one module or split into a plurality of sub-modules.

Finally, it should be noted that, the above embodiments are used only to describe the technical solutions of the present disclosure rather than limit the present disclosure. Although detailed descriptions are made to the present disclosure by referring to the preceding embodiments, those skilled in the art should understand that the technical solutions recorded in the preceding embodiments can be modified or part of the technical features therein is equivalently replaced. These modifications or substitutions will not cause the corresponding technical solutions to depart from the spirit and scope of the technical solutions of the embodiments of the present disclosure.

What is claimed is:

1. A method of fusing multi-sensor data, comprising:

obtaining a current vision perception result and a current first radar perception result corresponding to a target object at a current time;

based on a current vision perception feature corresponding to each current vision perception target in each current vision perception result and a target vision feature fusion model, determining a fusion vision feature corresponding to each current vision perception target, wherein the target vision feature fusion model is a model obtained by training based on a label perception feature corresponding to each sample object at each sample time and a sample vision perception feature corresponding to each sample vision perception target;

based on the fusion vision feature corresponding to each current vision perception target, a current first radar perception feature corresponding to each current first radar perception target in the current first radar perception result and a pre-constructed radar vision feature fusion model, determining mutually-matched current vision perception targets and current first radar perception targets and corresponding current fusion perception features, wherein the pre-constructed radar vision feature fusion model is a model obtained by training based on the sample vision perception features, the label perception features and a sample first radar perception result corresponding to each sample first radar perception target corresponding to each sample object at each sample time.

2. The method of claim 1, further comprising:

based on the current first radar perception features corresponding to the current first radar perception targets and a pre-constructed radar target recognition model, determining a current first radar true target and a corresponding current first radar perception feature from the current first radar perception targets, wherein the pre-constructed radar target recognition model is a model obtained by training based on the sample first radar perception feature corresponding to each sample first radar perception target and the label perception features.

3. The method of claim 2, further comprising:

obtaining historical features of historical targets corresponding to the target object at N historical times prior to the current time, wherein N is a positive integer and the historical features comprise: a feature obtained after a fusion vision feature corresponding to a matching historical vision perception target corresponding to each historical time and a feature corresponding to a historical first radar perception target are fused and optimized, an optimized feature corresponding to the first radar perception target without matching vision perception target corresponding to each historical time, or a prediction feature corresponding to an unperceived target of each historical time obtained by prediction based on a perception feature corresponding to a perceived target of a time prior to the historical time;

based on the historical feature of each historical target, the current perception features corresponding to the current perception targets, and a pre-constructed tracking model, determining mutually-matched historical targets and current perception targets, and optimized current perception features corresponding to the current perception targets matching the historical targets, wherein the current perception features corresponding to the current perception targets comprise: the current fusion perception features corresponding to the mutually-matched current vision perception targets and current first radar perception targets, or a radar perception feature corresponding to the current first radar true target without matching current vision perception target; the pre-constructed tracking model is a model obtained by training based on a sample perception feature corresponding to a sample perception target corresponding to each sample object at each sample time, sample historical features corresponding to sample historical targets corresponding to each sample object at N times prior to each sample time and label matching information corresponding to each sample perception target corresponding to each sample object at each sample time.

4. The method of claim 3, further comprising:

based on the historical feature of each historical target and a pre-constructed prediction model, determining a prediction feature corresponding to each historical target at the current time, wherein the pre-constructed prediction model is a model obtained by training based on sample historical perception results corresponding to sample historical targets corresponding to each sample object at N times prior to each sample time, and label matching information corresponding to each sample perception target corresponding to each sample object at each sample time;

based on current perception features of the current perception targets and the prediction feature corresponding to each historical target at the current time, determining a current target corresponding to the current time and a current feature corresponding to the current target.

5. The method of claim 1, wherein before, based on the vision perception feature corresponding to each current vision perception target in each current vision perception result and the target vision feature fusion model, determining the fusion vision feature corresponding to each current vision perception target, the method further comprises:

a process of constructing the target vision feature fusion model, comprising:

obtaining an initial vision feature fusion model;

obtaining the label perception feature corresponding to each sample object at each sample time and the sample vision perception feature corresponding to each sample vision perception target, wherein each label perception feature is a label perception feature perceived by a sample label radar of the corresponding sample object at the corresponding sample time, and the sample vision perception feature corresponding to each sample vision perception target is a vision perception feature perceived by a sample image collection device group of the corresponding sample object at the corresponding sample time;

by using the sample vision perception feature corresponding to each sample vision perception target and the label perception features, training the initial vision feature fusion model until the initial vision feature fusion model reaches a first convergence condition, so as to obtain a target vision feature fusion model.

6. The method of claim 5, wherein before, based on the fusion vision feature corresponding to each current vision perception target, the current first radar perception feature corresponding to each current first radar perception target in the current first radar perception result and the pre-constructed radar vision feature fusion model, determining the mutually-matched current vision perception targets and current first radar perception targets and the corresponding current fusion perception features, the method further comprises:

a process of constructing the pre-constructed radar vision feature fusion model, comprising:

obtaining an initial radar vision feature fusion model;

obtaining the sample first radar perception feature corresponding to each sample first radar perception target corresponding to each sample object at each sample time, wherein the sample first radar perception feature corresponding to each sample first radar perception target is a first radar perception feature perceived by a sample first radar of the corresponding sample object at the corresponding sample time;

based on a sample vision fusion feature corresponding to each sample vision perception target corresponding to each sample object at each sample time, the sample first radar perception feature corresponding to each sample first radar perception target corresponding to each sample object at each sample time, the label matching information between each sample vision perception target and each sample first radar perception target and the label perception feature corresponding to each sample object at each sample time, training the initial radar vision feature fusion model until the initial radar vision feature fusion model reaches a second convergence condition, so as to obtain a pre-constructed radar vision feature fusion model, wherein the sample vision fusion feature corresponding to the sample vision perception target is a fusion feature obtained through fusion based on the sample vision perception feature corresponding to the sample vision perception target and the target vision feature fusion model.

7. The method of claim 6, wherein before, based on the current first radar perception features corresponding to the current first radar perception targets and the pre-constructed radar target recognition model, determining the current first radar true target and the corresponding current first radar perception feature from the current first radar perception targets, the method further comprises:

a process of constructing the pre-constructed radar target recognition model, comprising:

obtaining an initial radar target recognition model;

obtaining label truth information corresponding to each sample first radar perception target corresponding to each sample object at each sample time, wherein the label truth information is information for indicating whether the corresponding sample first radar perception target is a true first radar perception target;

based on the sample first radar perception feature corresponding to each sample first radar perception target corresponding to each sample object at each sample time and the corresponding label truth information, training the initial radar target recognition model until the initial radar target recognition model reaches a third convergence condition, so as to obtain a pre-constructed radar target recognition model.

8. The method of claim 7, wherein before, based on the historical feature of each historical target, the current perception features corresponding to the current perception targets, and the pre-constructed tracking model, determining mutually-matched historical targets and current perception targets, the method further comprises:

a process of constructing the pre-constructed tracking model, comprising:

obtaining an initial tracking model, for each sample object, obtaining the sample historical features corresponding to the sample historical targets corresponding to the sample object at N times prior to each sample time, wherein the sample historical features comprise: features obtained after vision fusion features corresponding to matching sample vision perception targets corresponding to the sample object at N times prior to each sample time and features corresponding to the sample first radar perception targets are fused and optimized, optimized features corresponding to the sample first radar perception targets without matching sample vision perception targets corresponding to N times prior to each sample time, or a prediction feature corresponding to an unperceived target of each sample time obtained by prediction based on perception features corresponding to sample historical targets corresponding to N times prior to the sample time;

for each sample perception target corresponding to each sample object at each sample time, obtaining the label pairing information corresponding to the sample perception target corresponding to the sample target at the sample time, wherein the label pairing information corresponding to the sample perception target comprises: information for indicating whether the sample perception target corresponds to the same physical target as the sample historical targets corresponding to the sample object at N times prior to the sample time;

based on the sample perception features corresponding to the sample perception targets corresponding to each sample object at each sample time, the sample historical features corresponding to the sample historical targets corresponding to each sample object at N times prior to each sample time, the label pairing information corresponding to each sample perception target corresponding to each sample object at each sample time and the label perception feature corresponding to each sample object at each sample time, training the initial tracking model until the initial tracking model reaches a fourth convergence condition, so as to obtain a pre-constructed tracking model, wherein the sample perception features comprise: the sample fusion perception feature corresponding to the mutually-matched sample vision perception targets and sample first radar perception targets corresponding to each sample object at each sample time, or the first radar perception feature corresponding to the sample first radar true target without matching sample vision perception target and determined based on the sample radar perception features corresponding to the sample first radar perception targets and the pre-constructed radar target recognition model.

9. The method of claim 8, wherein the step of, based on the sample perception feature corresponding to the sample perception target corresponding to each sample object at each sample time, the sample historical features corresponding to the sample historical targets corresponding to each sample object at N times prior to each sample time, the label pairing information corresponding to each sample perception target corresponding to each sample object at each sample time and the label perception feature corresponding to each sample object at each sample time, training the initial tracking model until the initial tracking model reaches the fourth convergence condition, so as to obtain the pre-constructed tracking model comprises:

for each sample perception target corresponding to each sample object at each sample time, pairing each sample perception target corresponding to the sample object at the sample time and the sample historical targets corresponding to the sample object at N times prior to the sample time to obtain paired sample perception targets and sample historical targets corresponding to the sample object at the sample time;

randomly inputting the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception feature into a current tracking model to obtain a matching affinity between the paired sample perception targets and sample historical targets and the optimized sample perception features corresponding to the sample perception targets, wherein the matching affinity between the paired sample perception target and sample historical target represents a probability value that the paired sample perception target and sample historical target are a same physical target, and the current tracking model is the initial tracking model or a tracking model with adjusted model parameters;

when a number of the obtained matching affinities corresponding to the sample perception targets reaches a preset batch size, based on the preset batch size number of matching affinities between the paired sample perception targets and sample historical targets, the label pairing information corresponding to the sample perception targets in the paired sample perception targets and sample historical targets, the optimized sample perception features corresponding to the sample perception targets, the label perception features, a preset regression loss function, and a preset classification loss function, determining a current loss value corresponding to the current tracking model;

when the current loss value is less than a preset loss threshold, determining the current tracking model reaches the fourth convergence condition and obtaining an intermediate tracking model;

by using a preset smooth loss function, the preset regression loss function, the preset classification loss function, the sample perception features and the sample historical features respectively corresponding to the paired sample perception targets and sample historical targets corresponding to each sample object at each sample time, the label pairing information corresponding to the sample perception targets in the paired sample perception targets and sample historical targets, the label perception features, and specified sample historical features corresponding to the sample historical targets in the paired sample perception targets and sample historical targets, adjusting model parameters of the intermediate tracking model until the intermediate tracking model reaches a fifth convergence condition so as to obtain a pre-constructed tracking model, wherein the specified sample historical features corresponding to the sample historical targets in the paired sample perception targets and sample historical targets are sample historical features of the sample historical targets in the paired sample perception targets and sample historical targets at a previous time of the sample time corresponding to the sample perception target;

if the current loss value is not less than the preset threshold, adjusting the values of the model parameters of the current tracking model and repeating the step of randomly inputting the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception feature into the current tracking model to obtain the matching affinity corresponding to the sample perception targets until the current tracking model reaches the fourth convergence condition, so as to obtain an intermediate tracking model.

10. The method of claim 8, wherein before, based on the historical feature of each historical target and the pre-constructed prediction model, determining the prediction feature corresponding to each historical target at the current time, the method further comprises:

a process of constructing the pre-constructed prediction model, comprising:

obtaining an initial prediction model;

based on the sample historical features corresponding to the sample historical targets corresponding to each sample object at N times prior to each sample time and the label perception features, training the initial prediction model until the initial prediction model reaches a sixth convergence condition so as to obtain a pre-constructed prediction model.

11. An apparatus for fusing multi-sensor data, comprising:

one or more processors, and a non-transitory storage medium in communication with the one or more processors, the non-transitory storage medium configured to store program instructions, wherein, when executed by the one or more processors, the instructions cause the apparatus to perform:

obtaining a current vision perception result and a current first radar perception result corresponding to a target object at a current time;

based on a current vision perception feature corresponding to each current vision perception target in each current vision perception result and a target vision feature fusion model, determining a fusion vision feature corresponding to each current vision perception target, wherein the target vision feature fusion model is a model obtained by training based on a label perception feature corresponding to each sample object at each sample time and a sample vision perception feature corresponding to each sample vision perception target;

based on the fusion vision feature corresponding to each current vision perception target, a current first radar perception feature corresponding to each current first radar perception target in the current first radar perception result and a pre-constructed radar vision feature fusion model, determining mutually-matched current vision perception targets and current first radar perception targets and corresponding current fusion perception features, wherein the pre-constructed radar vision feature fusion model is a model obtained by training based on the sample vision perception features, the label perception features and a sample first radar perception result corresponding to each sample first radar perception target corresponding to each sample object at each sample time.

12. The apparatus of claim 11, further comprising:

based on the current first radar perception features corresponding to the current first radar perception targets and a pre-constructed radar target recognition model, determining a current first radar true target and a corresponding current first radar perception feature from the current first radar perception targets, wherein the pre-constructed radar target recognition model is a model obtained by training based on the sample first radar perception feature corresponding to each sample first radar perception target and the label perception features.

13. The apparatus of claim 12, further comprising:

obtaining historical features of historical targets corresponding to the target object at N historical times prior to the current time, wherein N is a positive integer and the historical features comprise: a feature obtained after a fusion vision feature corresponding to a matching historical vision perception target corresponding to each historical time and a feature corresponding to a historical first radar perception target are fused and optimized, an optimized feature corresponding to the first radar perception target without matching vision perception target corresponding to each historical time, or a prediction feature corresponding to an unperceived target of each historical time obtained by prediction based on a perception feature corresponding to a perceived target of a time prior to the historical time;

based on the historical feature of each historical target, the current perception features corresponding to the current perception targets, and a pre-constructed tracking model, determining mutually-matched historical targets and current perception targets, and optimized current perception features corresponding to the current perception targets matching the historical targets, wherein the current perception features corresponding to the current perception targets comprise: the current fusion perception features corresponding to the mutually-matched current vision perception targets and current first radar perception targets, or a radar perception feature corresponding to the current first radar true target without matching current vision perception target; the pre-constructed tracking model is a model obtained by training based on a sample perception feature corresponding to a sample perception target corresponding to each sample object at each sample time, sample historical features corresponding to sample historical targets corresponding to each sample object at N times prior to each sample time and label matching information corresponding to each sample perception target corresponding to each sample object at each sample time.

14. The apparatus of claim 13, further comprising:

based on the historical feature of each historical target and a pre-constructed prediction model, determining a prediction feature corresponding to each historical target at the current time, wherein the pre-constructed prediction model is a model obtained by training based on sample historical perception results corresponding to sample historical targets corresponding to each sample object at N times prior to each sample time, and label matching information corresponding to each sample perception target corresponding to each sample object at each sample time;

based on current perception features of the current perception targets and the prediction feature corresponding to each historical target at the current time, determining a current target corresponding to the current time and a current feature corresponding to the current target.

15. The apparatus of claim 11, wherein before, based on the vision perception feature corresponding to each current vision perception target in each current vision perception result and the target vision feature fusion model, determining the fusion vision feature corresponding to each current vision perception target, the method further comprises:

a process of constructing the target vision feature fusion model, comprising:

obtaining an initial vision feature fusion model;

obtaining the label perception feature corresponding to each sample object at each sample time and the sample vision perception feature corresponding to each sample vision perception target, wherein each label perception feature is a label perception feature perceived by a sample label radar of the corresponding sample object at the corresponding sample time, and the sample vision perception feature corresponding to each sample vision perception target is a vision perception feature perceived by a sample image collection device group of the corresponding sample object at the corresponding sample time;

by using the sample vision perception feature corresponding to each sample vision perception target and the label perception features, training the initial vision feature fusion model until the initial vision feature fusion model reaches a first convergence condition, so as to obtain a target vision feature fusion model.

16. The apparatus of claim 15, wherein before, based on the fusion vision feature corresponding to each current vision perception target, the current first radar perception feature corresponding to each current first radar perception target in the current first radar perception result and the pre-constructed radar vision feature fusion model, determining the mutually-matched current vision perception targets and current first radar perception targets and the corresponding current fusion perception features, the method further comprises:

a process of constructing the pre-constructed radar vision feature fusion model, comprising:

obtaining an initial radar vision feature fusion model;

obtaining the sample first radar perception feature corresponding to each sample first radar perception target corresponding to each sample object at each sample time, wherein the sample first radar perception feature corresponding to each sample first radar perception target is a first radar perception feature perceived by a sample first radar of the corresponding sample object at the corresponding sample time;

based on a sample vision fusion feature corresponding to each sample vision perception target corresponding to each sample object at each sample time, the sample first radar perception feature corresponding to each sample first radar perception target corresponding to each sample object at each sample time, the label matching information between each sample vision perception target and each sample first radar perception target and the label perception feature corresponding to each sample object at each sample time, training the initial radar vision feature fusion model until the initial radar vision feature fusion model reaches a second convergence condition, so as to obtain a pre-constructed radar vision feature fusion model, wherein the sample vision fusion feature corresponding to the sample vision perception target is a fusion feature obtained through fusion based on the sample vision perception feature corresponding to the sample vision perception target and the target vision feature fusion model.

17. The apparatus of claim 16, wherein before, based on the current first radar perception features corresponding to the current first radar perception targets and the pre-constructed radar target recognition model, determining the current first radar true target and the corresponding current first radar perception feature from the current first radar perception targets, the method further comprises:

a process of constructing the pre-constructed radar target recognition model, comprising:

obtaining an initial radar target recognition model;

obtaining label truth information corresponding to each sample first radar perception target corresponding to each sample object at each sample time, wherein the label truth information is information for indicating whether the corresponding sample first radar perception target is a true first radar perception target;

based on the sample first radar perception feature corresponding to each sample first radar perception target corresponding to each sample object at each sample time and the corresponding label truth information, training the initial radar target recognition model until the initial radar target recognition model reaches a third convergence condition, so as to obtain a pre-constructed radar target recognition model.

18. The apparatus of claim 17, wherein before, based on the historical feature of each historical target, the current perception features corresponding to the current perception targets, and the pre-constructed tracking model, determining mutually-matched historical targets and current perception targets, the method further comprises:

a process of constructing the pre-constructed tracking model, comprising:

obtaining an initial tracking model, for each sample object, obtaining the sample historical features corresponding to the sample historical targets corresponding to the sample object at N times prior to each sample time, wherein the sample historical features comprise: features obtained after vision fusion features corresponding to matching sample vision perception targets corresponding to the sample object at N times prior to each sample time and features corresponding to the sample first radar perception targets are fused and optimized, optimized features corresponding to the sample first radar perception targets without matching sample vision perception targets corresponding to N times prior to each sample time, or a prediction feature corresponding to an unperceived target of each sample time obtained by prediction based on perception features corresponding to sample historical targets corresponding to N times prior to the sample time;

for each sample perception target corresponding to each sample object at each sample time, obtaining the label pairing information corresponding to the sample perception target corresponding to the sample target at the sample time, wherein the label pairing information corresponding to the sample perception target comprises: information for indicating whether the sample perception target corresponds to the same physical target as the sample historical targets corresponding to the sample object at N times prior to the sample time;

based on the sample perception features corresponding to the sample perception targets corresponding to each sample object at each sample time, the sample historical features corresponding to the sample historical targets corresponding to each sample object at N times prior to each sample time, the label pairing information corresponding to each sample perception target corresponding to each sample object at each sample time and the label perception feature corresponding to each sample object at each sample time, training the initial tracking model until the initial tracking model reaches a fourth convergence condition, so as to obtain a pre-constructed tracking model, wherein the sample perception features comprise: the sample fusion perception feature corresponding to the mutually-matched sample vision perception targets and sample first radar perception targets corresponding to each sample object at each sample time, or the first radar perception feature corresponding to the sample first radar true target without matching sample vision perception target and determined based on the sample radar perception features corresponding to the sample first radar perception targets and the pre-constructed radar target recognition model.

19. The apparatus of claim 18, wherein the step of, based on the sample perception feature corresponding to the sample perception target corresponding to each sample object at each sample time, the sample historical features corresponding to the sample historical targets corresponding to each sample object at N times prior to each sample time, the label pairing information corresponding to each sample perception target corresponding to each sample object at each sample time and the label perception feature corresponding to each sample object at each sample time, training the initial tracking model until the initial tracking model reaches the fourth convergence condition, so as to obtain the pre-constructed tracking model comprises:

for each sample perception target corresponding to each sample object at each sample time, pairing each sample perception target corresponding to the sample object at the sample time and the sample historical targets corresponding to the sample object at N times prior to the sample time to obtain paired sample perception targets and sample historical targets corresponding to the sample object at the sample time;

randomly inputting the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception feature into a current tracking model to obtain a matching affinity between the paired sample perception targets and sample historical targets and the optimized sample perception features corresponding to the sample perception targets, wherein the matching affinity between the paired sample perception target and sample historical target represents a probability value that the paired sample perception target and sample historical target are a same physical target, and the current tracking model is the initial tracking model or a tracking model with adjusted model parameters;

when a number of the obtained matching affinities corresponding to the sample perception targets reaches a preset batch size, based on the preset batch size number of matching affinities between the paired sample perception targets and sample historical targets, the label pairing information corresponding to the sample perception targets in the paired sample perception targets and sample historical targets, the optimized sample perception features corresponding to the sample perception targets, the label perception features, a preset regression loss function, and a preset classification loss function, determining a current loss value corresponding to the current tracking model;

when the current loss value is less than a preset loss threshold, determining the current tracking model reaches the fourth convergence condition and obtaining an intermediate tracking model;

by using a preset smooth loss function, the preset regression loss function, the preset classification loss function, the sample perception features and the sample historical features respectively corresponding to the paired sample perception targets and sample historical targets corresponding to each sample object at each sample time, the label pairing information corresponding to the sample perception targets in the paired sample perception targets and sample historical targets, the label perception features, and specified sample historical features corresponding to the sample historical targets in the paired sample perception targets and sample historical targets, adjusting model parameters of the intermediate tracking model until the intermediate tracking model reaches a fifth convergence condition so as to obtain a pre-constructed tracking model, wherein the specified sample historical features corresponding to the sample historical targets in the paired sample perception targets and sample historical targets are sample historical features of the sample historical targets in the paired sample perception targets and sample historical targets at a previous time of the sample time corresponding to the sample perception target;

if the current loss value is not less than the preset threshold, adjusting the values of the model parameters of the current tracking model and repeating the step of randomly inputting the sample perception features and the sample historical features respectively corresponding to the paired sample perception targets and sample historical targets corresponding to each sample object at each sample time, the label pairing information corresponding to the sample perception targets in the paired sample perception targets and sample historical targets and the label perception feature into the current tracking model to obtain the matching affinity corresponding to the sample perception targets until the current tracking model reaches the fourth convergence condition, so as to obtain an intermediate tracking model.

20. The apparatus of claim 18, wherein before, based on the historical feature of each historical target and the pre-constructed prediction model, determining the prediction feature corresponding to each historical target at the current time, the method further comprises:

a process of constructing the pre-constructed prediction model, comprising:

obtaining an initial prediction model;

based on the sample historical features corresponding to the sample historical targets corresponding to each sample object at N times prior to each sample time and the label perception features, training the initial prediction model until the initial prediction model reaches a sixth convergence condition so as to obtain a pre-constructed prediction model.

* * * * *